US012529010B2

(12) United States Patent
Kimura et al.

(10) Patent No.: US 12,529,010 B2
(45) Date of Patent: Jan. 20, 2026

(54) COMPOUND, PRECURSOR COMPOUND THEREOF, SURFACTANT COMPOSITION, AND DETERGENT COMPOSITION

(71) Applicant: KAO CORPORATION, Tokyo (JP)

(72) Inventors: Akiyoshi Kimura, Wakayama (JP); Ojiro Tamagawa, Wakayama (JP)

(73) Assignee: KAO CORPORATION, Tokyo (JP)

( * ) Notice: Subject to any disclaimer, the term of this patent is extended or adjusted under 35 U.S.C. 154(b) by 339 days.

(21) Appl. No.: 18/037,275

(22) PCT Filed: Nov. 30, 2021

(86) PCT No.: PCT/JP2021/043775
§ 371 (c)(1),
(2) Date: May 16, 2023

(87) PCT Pub. No.: WO2022/114209
PCT Pub. Date: Jun. 2, 2022

(65) Prior Publication Data
US 2024/0002748 A1 Jan. 4, 2024

(30) Foreign Application Priority Data

Nov. 30, 2020 (JP) ................................ 2020-198405
Nov. 30, 2020 (JP) ................................ 2020-198407

(51) Int. Cl.
*C11D 1/00* (2006.01)
*C11D 1/72* (2006.01)
*C11D 17/00* (2006.01)

(52) U.S. Cl.
CPC ............ *C11D 1/72* (2013.01); *C11D 17/0008* (2013.01)

(58) Field of Classification Search
CPC ..... C11D 1/72; C11D 17/0008; C11D 3/2068; C08G 65/2609
USPC .......................................................... 510/405
See application file for complete search history.

(56) References Cited

U.S. PATENT DOCUMENTS

| | | | | |
|---|---|---|---|---|
| 3,790,640 A | 2/1974 | Kurosaki et al. | | |
| 4,234,444 A | 11/1980 | Wegener et al. | | |
| 6,369,025 B1 * | 4/2002 | Trinh | ........................ | C11D 3/33 510/525 |
| 6,380,439 B1 | 4/2002 | Klaas et al. | | |
| 2002/0160926 A1 * | 10/2002 | Trinh | ................... | C11D 3/2003 510/330 |
| 2017/0253839 A1 * | 9/2017 | Scheibel | .............. | C11D 17/003 |

FOREIGN PATENT DOCUMENTS

| | | | |
|---|---|---|---|
| GB | 1236703 | A | 6/1971 |
| JP | 49-20166 | B1 | 5/1974 |
| JP | 49-20283 | B1 | 5/1974 |
| JP | 49-20284 | B1 | 5/1974 |
| JP | 49-20285 | B1 | 5/1974 |
| JP | 49-20286 | B1 | 5/1974 |
| JP | 55-12194 | A | 1/1980 |
| JP | 61-166894 | A | 7/1986 |
| JP | 11-349507 | A | 12/1999 |
| JP | 2001-2715 | A | 1/2001 |
| JP | 2001-523235 | A | 11/2001 |
| JP | 2005-225788 | A | 8/2005 |
| JP | 2011-236347 | A | 11/2011 |

OTHER PUBLICATIONS

STIC Search Report dated Jun. 16, 2025.*
International Search Report for PCT/JP2021/043775 mailed on Feb. 1, 2022.
Extended European Search Report for European Application No. 21898180.1, dated May 6, 2024.
English translation of the International Preliminary Report on Patentability and Written Opinion of the International Searching Authority for International Application No. PCT/JP2021/043775, dated Jun. 15, 2023.

* cited by examiner

*Primary Examiner* — Eisa B Elhilo
(74) *Attorney, Agent, or Firm* — Birch, Stewart, Kolasch & Birch, LLP

(57) ABSTRACT

A compound is provided that exhibits high detergency even when contained at a low concentration in a detergent composition, and that has a narrow gelation concentration range at low temperatures and excellent handling properties; a precursor compound for producing the compound; and a surfactant composition and a detergent composition that include the compound. The compound of the present invention is represented by a chemical formula (1) below:

[Chemical Formula (1)]

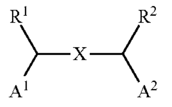

wherein $R^1$ and $R^2$ are each an aliphatic hydrocarbon group, X is a single bond or a hydrocarbon group having 1 or more and 5 or less carbon atoms, a total number of carbon atoms of $R^1$, $R^2$, and X is 2 or more and 39 or less, $A^1$ is $—O(-A^{11}O)_m—H$ or $—O(-A^{12}O)_p—H$, $A^2$ is $—O—R^3O(-A^{21}O)_n—H$ or $—O(-A^{22}O)_{q+1}—H$, wherein $R^3$, $A^{11}$, $A^{12}$, $A^{21}$, $A^{22}$, m, n, p, q are defined in the specification.

19 Claims, No Drawings

COMPOUND, PRECURSOR COMPOUND THEREOF, SURFACTANT COMPOSITION, AND DETERGENT COMPOSITION

TECHNICAL FIELD

The present invention relates to a compound and a precursor compound for producing the compound. The present invention also relates to a surfactant composition and a detergent composition that include the compound.

BACKGROUND ART

Nonionic surfactants are used in a wide range of fields such as laundry detergents, dishwashing detergents, residential detergents, body cleansers, iron and steel cleaning, and precision cleaning. The required performance of the nonionic surfactants is, for example, high detergency, compatibility with products, and easiness of handling.

General nonionic surfactants have a problem of having a wide gelled region.

Patent Document 1 discloses a surfactant that has excellent detergency for general fibers and includes a mixed product including two or more internal vicinal two hydrophilic groups-containing compounds having a specific structure.

Patent Document 2 discloses a technique of adding to a detergent composition an addition product obtained by adding ethylene oxide to an internally positioned vicinal alkanediol in order to provide a detergent composition exhibiting a low viscosity at room temperature.

PRIOR ART DOCUMENTS

Patent Documents

Patent Document 1: GB Patent No. 1236703 description
Patent Document 2: JP-A-55-12194

SUMMARY OF THE INVENTION

Problems to be Solved by the Invention

The surfactant of Patent Document 1, however, has a problem of remarkably lowering the detergency when contained at a low concentration in a composition. The detergent composition of Patent Document 2 prevents the generation of gel by using a polyoxyethylene alkyl ether and the addition product in combination. However, when only the addition product is used as a surfactant, or when the addition product and another surfactant are used in combination, gel is easily produced at low temperatures, and the detergent composition thus has a problem of having poor handling properties.

The present invention has been made in view of the circumstances described above, and provides: a compound that exhibits high detergency even when contained at a low concentration in a detergent composition, and that has a narrow gelation concentration range at low temperatures and excellent handling properties; and a precursor compound for producing the compound. The present invention also provides a surfactant composition and a detergent composition that include the compound.

Means for Solving the Problems

As a result of an earnest study, the inventors of the present invention have found that the problems can be solved by a compound having a following specific structure.

The present invention relates to a compound represented by a chemical formula (1) below:

[Chemical Formula (1)]

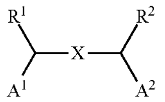

wherein $R^1$ and $R^2$ are each an aliphatic hydrocarbon group, X is a single bond or a hydrocarbon group having 1 or more and 5 or less carbon atoms, a total number of carbon atoms of $R^1$, $R^2$, and X is 2 or more and 39 or less, $A^1$ is $—O(-A^{11}O)_m—H$ or $—O(-A^{12}O)_p—H$, $A^2$ is $—O—R^3O(-A^{21}O)_n—H$ or $—O(-A^{22}O)_{q+1}—H$, $R^3$ is an alkanediyl group having 4 or more and 18 or less carbon atoms, m pieces of $A^{11}$ and n pieces of $A^{21}$ are each independently an alkanediyl group having 2 or more and 3 or less carbon atoms, p pieces of $A^{12}$ and q+1 pieces of $A^{22}$ are each independently an alkanediyl group having 2 or more and 8 or less carbon atoms, at least one piece of $A^{22}$ among the q+1 pieces of $A^{22}$ is a linear alkane-α,ω-diyl group having 3 or more and 8 or less carbon atoms, m, n, p, and q are an average value and are each independently 0 or more, a total of m and n is more than 0 and 50 or less, and a total of p and q is more than 0 and 50 or less.

The present invention relates to a precursor compound for producing the compound represented by the chemical formula (1), the precursor compound being represented by a chemical formula (2) below:

[Chemical Formula (2)]

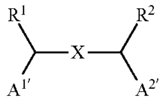

wherein $R^1$ and $R^2$ are each an aliphatic hydrocarbon group, X is a single bond or a hydrocarbon group having 1 or more and 5 or less carbon atoms, a total number of carbon atoms of $R^1$, $R^2$, and X is 2 or more and 39 or less, $A^{1'}$ is —OH, $A^{2'}$ is $—O—R^3OH$ or $—O\text{-}A^{221}OH$, $R^3$ is an alkanediyl group having 4 or more and 18 or less carbon atoms, and $A^{221}$ is a linear alkane-α,ω-diyl group having 3 or more and 8 or less carbon atoms.

The present invention relates to use of the precursor compound represented by the chemical formula (2), for producing the compound represented by the chemical formula (1).

The present invention relates to a method for producing the compound represented by the chemical formula (1), including a process of adding an alkylene oxide having 2 or more and 3 or less carbon atoms to the precursor compound represented by the chemical formula (2) in which $A^{1'}$ is —OH and $A^{2'}$ is $—O—R^3OH$, or a process of adding an alkylene oxide having 2 or more and 8 or less carbon atoms to the precursor compound represented by the chemical formula (2) in which $A^{1'}$ is —OH and $A^{2'}$ is $—O\text{-}A^{221}OH$.

Effect of the Invention

The compound (hereinafter, also referred to as an internal two hydrophilic groups-containing compound) represented by the chemical formula (1) of the present invention has a characteristic chemical structure (particularly a pendant hydrophilic group). Therefore, the internal two hydrophilic groups-containing compound according to the present invention has excellent effects of exhibiting high detergency even when contained at a low concentration in a detergent composition, and having a narrow gelation concentration range at low temperatures. A detergent composition according to the present invention that contains the internal two hydrophilic groups-containing compound exhibits high detergency even with a low concentration of the surfactant therein, is less likely to cause gelation in a wide range of concentration at low temperatures, and has excellent handling properties.

MODE FOR CARRYING OUT THE INVENTION

Hereinafter, a detailed described is made of the present invention.

<Internal Two Hydrophilic Groups-Containing Compound>

The internal two hydrophilic groups-containing compound of the present invention is a compound represented by the chemical formula (1) below:

[Chemical Formula (1)]

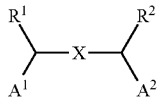

wherein $R^1$ and $R^2$ are each an aliphatic hydrocarbon group, X is a single bond or a hydrocarbon group having 1 or more and 5 or less carbon atoms, a total number of carbon atoms of $R^1$, $R^2$, and X is 2 or more and 39 or less, $A^1$ is $—O(-A^{11}O)_m—H$ or $—O(-A^{12}O)_p—H$, $A^2$ is $—O—R^3O(-A^{21}O)_n—H$ or $—O(-A^{22}O)_{q+1}—H$, $R^3$ is an alkanediyl group having 4 or more and 18 or less carbon atoms, m pieces of $A^{11}$ and n pieces of $A^{21}$ are each independently an alkanediyl group having 2 or more and 3 or less carbon atoms, p pieces of $A^{12}$ and q+1 pieces of $A^{22}$ are each independently an alkanediyl group having 2 or more and 8 or less carbon atoms, at least one piece of $A^{22}$ among the q+1 pieces of $A^{22}$ is a linear alkane-α,ω-diyl group having 3 or more and 8 or less carbon atoms, m, n, p, and q are an average value and are each independently 0 or more, a total of m and n is more than 0 and 50 or less, and a total of p and q is more than 0 and 50 or less.

$R^1$ and $R^2$ are each an aliphatic hydrocarbon group, and are each preferably a linear or branched alkyl group, more preferably a linear alkyl group, further preferably a linear primary alkyl group, from the viewpoints of production efficiency and easiness of production. $R^1$ and $R^2$ each independently have 1 or more and 33 or less carbon atoms and may each have a carbon number distribution. $R^1$ and $R^2$ may be a same aliphatic hydrocarbon group or different aliphatic hydrocarbon groups.

In the chemical formula (1), X is a single bond or a hydrocarbon group having 1 or more and 5 or less carbon atoms, and is preferably a single bond or a hydrocarbon group having 1 or more and 3 or less carbon atoms, more preferably a single bond or a hydrocarbon group having 1 or more and 2 or less carbon atoms, further preferably a single bond or a hydrocarbon group having 1 carbon atom, still further preferably a single bond, from the viewpoints of production efficiency and easiness of production.

The total number of carbon atoms of $R^1$, $R^2$, and X is 2 or more and 39 or less, is preferably 10 or more, more preferably 12 or more, further preferably 14 or more from the viewpoint of improving detergency, and is preferably 20 or less, more preferably 18 or less, further preferably 16 or less from the viewpoint of improving water solubility.

The total number of carbon atoms of $R^1$, $R^2$, and X is preferably even from the viewpoint of easiness of obtaining a raw material.

The internal two hydrophilic groups-containing compound preferably includes two or more compounds that have a same total number of carbon atoms of $R^1$, $R^2$, and X, but are different in number of carbon atoms of each of $R^1$ and $R^2$, from the viewpoints of production efficiency and easiness of production.

The internal two hydrophilic groups-containing compound more preferably includes two or more compounds that have a single bond as X and a same total number of carbon atoms of $R^1$, $R^2$, and X, but are different in number of carbon atoms of each of $R^1$ and $R^2$, from the viewpoints of production efficiency and easiness of production.

When the internal two hydrophilic groups-containing compound includes two or more compounds that have a single bond as X, and are different in total number of carbon atoms of $R^1$ and $R^2$, the total content of a compound having a total number of carbon atoms of $R^1$ and $R^2$ of 14 and a compound having a total number of carbon atoms of $R^1$ and $R^2$ of 16 is, in the whole internal two hydrophilic groups-containing compound, preferably 75 mass % or more, more preferably 85 mass % or more, further preferably 95 mass % or more, still further preferably 100 mass %, from the viewpoint of improving detergency and narrowing the range of gelation concentration at low temperatures.

When being a hydrocarbon group, X is preferably a linear or branched alkanediyl group, more preferably a linear alkanediyl group, further preferably a linear α,ω-alkanediyl group, from the viewpoints of production efficiency and easiness of production.

When the internal two hydrophilic groups-containing compound includes two or more compounds that have a same total number of carbon atoms of $R^1$, $R^2$, and X, but are different in number of carbon atoms of each of $R^1$ and $R^2$, the content proportion of a compound in which $R^1$ has 5 or more carbon atoms and $R^2$ has 5 or more carbon atoms is, in the whole internal two hydrophilic groups-containing compound, preferably 10 mass % or more, more preferably 20 mass % or more, further preferably 30 mass % or more, and preferably 90 mass % or less, more preferably 80 mass % or less, further preferably 70 mass % or less, from the viewpoint of improving detergency and narrowing the range of gelation concentration at low temperatures.

In the chemical formula (1), $A^1$ is $—O(-A^{11}O)_m—H$ or $—O(-A^{12}O)_p—H$, and $A^2$ is $—O—R^3O(-A^{21}O)_n—H$ or $—O(-A^{22}O)_{q+1}—H$ $R^3$ is an alkanediyl group having 4 or more and 18 or less carbon atoms, from the viewpoint of detergency at low concentrations. The alkanediyl group is preferably a linear alkanediyl group, more preferably a linear alkane-α,ω-diyl group from the viewpoint of improving detergency and water solubility, and is further preferably a butane-1,4-diyl group or a hexane-1,6-diyl group from the viewpoint of easiness of production. The alkanediyl group has preferably 4 or more and 12 or less carbon atoms, more preferably 4 or more and 8 or less carbon atoms, further preferably 4 or more and 6 or less carbon atoms, from the viewpoint of improving detergency at low concentrations and water solubility.

$A^{11}O$ and $A^{21}O$ are each an alkyleneoxy group, and $A^{11}$ and $A^{21}$ are each independently an alkanediyl group having 2 or more and 3 or less carbon atoms, preferably each independently an alkanediyl group having 2 or 3 carbon atoms from the viewpoint of improving detergency and water solubility. The alkanediyl group is preferably a 1,2-alkanediyl group from the viewpoint of easiness of production, is more preferably one or more selected from an ethanediyl group, and a 1,2-propanediyl group from the viewpoint of improving detergency and water solubility, and is further preferably an ethanediyl group from the viewpoint of detergency. The alkyleneoxy group is specifically an ethyleneoxy group, a branched propyleneoxy group, or a linear propyleneoxy group. The alkyleneoxy group is preferably an ethyleneoxy group or a branched propyleneoxy group. m pieces of $A^{14}O$ and n pieces of $A^{21}O$ may each independently include one type of the alkyleneoxy group or two or more types of the alkyleneoxy groups. Even when the internal two hydrophilic groups-containing compound includes two or more compounds that are different in number of pieces of $A^{11}O$ or $A^{21}O$, m or n in the chemical formula (1) represents the average value of the total number of alkyleneoxy groups.

When m pieces of $A^{11}O$ or n pieces of $A^{21}O$ include two or more types of the alkyleneoxy groups, the alkyleneoxy groups are preferably an ethyleneoxy group and a branched propyleneoxy group. When m pieces of $A^{11}O$ or n pieces of $A^{21}O$ include an ethyleneoxy group and a branched propyleneoxy group, the molar ratio (ethyleneoxy group/branched propyleneoxy group) of the ethyleneoxy group to the branched propyleneoxy group is preferably 2/1 or more, more preferably 4/1 or more from the viewpoint of improving detergency and water solubility, and is preferably 100/1 or less, more preferably 20/1 or less, further preferably 15/1 or less from the viewpoint of prevention of gelation. The molar ratio (ethyleneoxy group/branched propyleneoxy group) is preferably 2/1 to 100/1, more preferably 2/1 to 20/1, further preferably 2/1 to 15/1, still further preferably 4/1 to 15/1, from the viewpoint of improving detergency and water solubility, and the viewpoint of prevention of gelation.

$A^{12}O$ and $A^{22}O$ are each an alkyleneoxy group, and $A^{12}$ and $A^{22}$ are each independently an alkanediyl group having 2 or more and 8 or less carbon atoms from the viewpoint of improving detergency and water solubility. The alkanediyl group is preferably a 1,2-alkanediyl group from the viewpoint of easiness of production, is more preferably one or more selected from an ethanediyl group or a 1,2-propanediyl group from the viewpoint of improving detergency and water solubility, and is further preferably an ethanediyl group from the viewpoint of detergency. The alkanediyl group has preferably 2 or more and 6 or less carbon atoms, more preferably 2 or more and 5 or less carbon atoms, further preferably 2 or more and 4 or less carbon atoms, from the viewpoint of improving detergency and water solubility. Examples of the alkyleneoxy group include an ethyleneoxy group, a branched alkyleneoxy group having 3 or more and 8 or less carbon atoms, and a linear alkyleneoxy group having 3 or more and 8 or less carbon atoms. The alkyleneoxy group is preferably an ethyleneoxy group or a branched alkyleneoxy group having 3 or more and 8 or less carbon atoms. p pieces of $A^{12}O$ and q+1 pieces of $A^{22}O$ may each independently include one type of the alkyleneoxy group or two or more types of the alkyleneoxy groups. Even when the internal two hydrophilic groups-containing compound includes two or more compounds that are different in number of pieces of $A^{12}O$ or $A^{22}O$, p or q in the chemical formula (1) represents the average value of the total number of alkyleneoxy groups.

When p pieces of $A^{12}O$ or q+1 pieces of $A^{22}O$ include two or more types of the alkyleneoxy groups, the alkyleneoxy groups are preferably an ethyleneoxy group and one or more types of branched alkyleneoxy groups having 3 or more and 8 or less carbon atoms, more preferably an ethyleneoxy group and a branched propyleneoxy group. When p pieces of $A^{12}O$ or q+1 pieces of $A^{22}O$ include an ethyleneoxy group and one or more types of branched alkyleneoxy groups having 3 or more and 8 or less carbon atoms (or a branched propyleneoxy group), the molar ratio (ethyleneoxy group/branched alkyleneoxy group having 3 or more and 8 or less carbon atoms (or branched propyleneoxy group) of the ethyleneoxy group to the branched alkyleneoxy group having 3 or more and 8 or less carbon atoms (or the branched propyleneoxy group) is preferably 2/1 or more, more preferably 4/1 or more from the viewpoint of improving detergency and water solubility, and is preferably 100/1 or less, more preferably 20/1 or less, further preferably 15/1 or less from the viewpoint of prevention of gelation. The molar ratio (ethyleneoxy group/branched alkyleneoxy group having 3 or more and 8 or less carbon atoms (or branched propyleneoxy group)) is preferably 2/1 to 100/1, more preferably 2/1 to 20/1, further preferably 2/1 to 15/1, still further preferably 4/1 to 15/1, from the viewpoint of improving detergency and water solubility, and the viewpoint of prevention of gelation.

Among the q+1 pieces of $A^{22}$, at least one piece of $A^{22}$ is a linear alkane-α,ω-diyl group having 3 or more and 8 or less carbon atoms. The linear alkane-α,ω-diyl group has preferably 3 or more and 6 or less carbon atoms, more preferably 3 or more and 5 or less carbon atoms, further preferably 3 or 4 carbon atoms, from the viewpoint of improving detergency and water solubility. The linear alkane-α,ω-diyl group may be $A^{22}$ at any position in a repeating structure of q+1 pieces of $A^{22}O$.

$A^2$ is preferably $—O-A^{221}O(-A^{22}O)_q—H$ from the viewpoint of improving low-temperature stability and detergency, and the viewpoint of easiness of production, and at least $A^{221}$ is a linear alkane-α,ω-diyl group having 3 or more and 8 or less carbon atoms.

The content of the linear alkane-α,ω-diyl group having 3 or more and 8 or less carbon atoms is, on average per molecule, preferably 1 mol or more, and preferably 5 mol or less, more preferably 3 mol or less, further preferably 2 mol or less, from the viewpoint of improving detergency and water solubility, and the viewpoint of prevention of gelation.

When m pieces of $A^{11}O$, n pieces of $A^{21}O$, p pieces of $A^{12}O$, or q+1 pieces of $A^{22}O$ include two or more types of the alkyleneoxy groups, the repeating structure of the alkyleneoxy groups may include a random structure, a block structure, or a combination of a random structure and a block structure. The repeating structure, however, includes preferably a block structure, more preferably an EO block-PO block structure, a PO block-EO block structure, an EO block-PO block-EO block structure, or a PO block-EO block-PO block structure, further preferably an EO block-PO block-EO block structure, from the viewpoint of prevention of gelation.

In the chemical formula (1), m, n, p, and q are an average value and are each independently 0 or more, the total of m and n is more than 0 and 50 or less, and the total of p and q is more than 0 and 50 or less. The total of m and n, or the total of p and q is preferably 3 or more, more preferably 5 or more, further preferably 8 or more, still further preferably 10 or more from the viewpoint of improving detergency and water solubility, and is preferably 40 or less, more preferably 30 or less, further preferably 25 or less, still further preferably 20 or less from the viewpoints of preventing gelation and improving detergency.

The method for producing the internal two hydrophilic groups-containing compound in which $A^1$ is —O(-$A^{11}$O)$_m$—H, and $A^2$ is —O—$R^3$O(-$A^{21}$O)$_n$—H is not particularly limited, and the internal two hydrophilic groups-containing compound can be produced, for example, by oxidizing a double bond of an internal olefin with a peroxide such as hydrogen peroxide and peracetic acid to synthesize an internal epoxide, adding to the obtained internal epoxide glycol having 4 or more and 18 or less carbon atoms to synthesize an internal diol, and adding to the obtained internal diol an alkylene oxide having 2 or more and 3 or less carbon atoms. When the internal olefin is a mixed product of two or more internal olefins that have a same total number of carbon atoms but a double bond at different positions therebetween, the internal two hydrophilic groups-containing compound obtained by the above-described production method is a mixed product of two or more compounds that have a same total number of carbon atoms of $R^1$ and $R^2$, but are different in number of carbon atoms of each of $R^1$ and $R^2$.

The method for producing the internal two hydrophilic groups-containing compound in which $A^1$ is —O(-$A^{12}$O)$_p$—H, and $A^2$ is —O(-$A^{22}$O)$_{q+1}$—H is not particularly limited, and the internal two hydrophilic groups-containing compound can be produced, for example, by oxidizing a double bond of an internal olefin with a peroxide such as hydrogen peroxide and peracetic acid to synthesize an internal epoxide, hydrolyzing the obtained internal epoxide or adding to the internal epoxide a both-terminal alkanediol having 3 or more and 8 or less carbon atoms to synthesize an internal diol, and adding to the obtained internal diol an alkylene oxide having 2 or more and 8 or less carbon atoms. The method for introducing a linear alkane-α,ω-diyl group having 3 or more and 8 or less carbon atoms into a repeating structure of $A^{12}$O and/or $A^{22}$O is, for example, reacting the compound having an alkylene oxide added thereto with X—$(CH_2)_n$—OH (X: halogen group, n: integer of 3 or more and 8 or less) (for example, 3-chloro-1-propanol) under alkaline conditions, or with a both-terminal alkanediol (for example, 1,3-propanediol) having 3 or more and 8 or less carbon atoms under acid catalyst conditions, and further adding to the obtained internal diol an alkylene oxide having 2 or more and 8 or less carbon atoms. When the internal olefin is a mixed product of two or more internal olefins that have a same total number of carbon atoms but a double bond at different positions therebetween, the internal two hydrophilic groups-containing compound obtained by the above-described production method is a mixed product of two or more compounds that have a same total number of carbon atoms of $R^1$ and $R^2$, but are different in number of carbon atoms of each of $R^1$ and $R^2$.

The internal olefin used for the production of the internal two hydrophilic groups-containing compound may contain a terminal olefin. In such a case, the content of the terminal olefin included in the olefin is, for example, 0.1 mass % or more, 0.2 mass % or more, and 5 mass % or less, 3 mass % or less, 2 mass % or less, 1 mass % or less, 0.5 mass % or less.

<Precursor Compound>

A precursor compound according to the present invention is a compound, represented by a chemical formula (2) below in which $A^{2'}$ is —O—$R^3$OH, for producing the compound represented by the chemical formula (1) in which $A^2$ is —O—$R^3$O(-$A^{21}$O)$_n$—H, or a compound, represented by the chemical formula (2) below in which $A^{2'}$ is —O-$A^{221}$OH, for producing the compound represented by the chemical formula (1) in which $A^2$ is —O-$A^{221}$O(-$A^{22}$O)$_q$—H.

[Chemical Formula (2)]

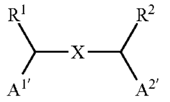

(In the chemical formula, $R^1$ and $R^2$ is an aliphatic hydrocarbon group, X is a single bond or a hydrocarbon group having 1 or more and 5 or less carbon atoms, the total number of carbon atoms of $R^1$, $R^2$, and X is 2 or more and 39 or less, $A^{1'}$ is —OH, $A^{2'}$ is —O—$R^3$OH or —O-$A^{221}$OH, $R^3$ is an alkanediyl group having 4 or more and 18 or less carbon atoms, and $A^{221}$ is a linear alkane-α,ω-diyl group having 3 or more and 8 or less carbon atoms.)

The aspects and suitable aspect of $R^1$ and $R^2$, and X in the chemical formula (2) are the same as the aspects and suitable aspects of $R^1$ and $R^2$, and X in the chemical formula (1).

$R^3$ is an alkanediyl group having 4 or more and 18 or less carbon atoms, the alkanediyl group may be either a linear or branched alkanediyl group, but is preferably a linear alkanediyl group. The alkanediyl group has preferably 4 or more and 12 or less carbon atoms, more preferably 4 or more and 8 or less carbon atoms, further preferably 4 or more and 6 or less carbon atoms.

$A^{221}$ has 3 or more and 8 or less carbon atoms, preferably 3 or more and 6 or less carbon atoms, more preferably 3 or more and 5 or less carbon atoms, further preferably 3 or 4 carbon atoms.

The precursor compound preferably includes two or more compounds that have a same total number of carbon atoms of $R^1$, $R^2$, and X, but are different in number of carbon atoms of each of $R^1$ and $R^2$, from the viewpoints of production efficiency and easiness of production.

The precursor compound more preferably includes two or more compounds that have a single bond as X and a same total number of carbon atoms of $R^1$ and $R^2$, but are different in number of carbon atoms of each of $R^1$ and $R^2$, from the viewpoints of production efficiency and easiness of production.

When the precursor compound includes two or more compounds that have a single bond as X, and are different in total number of carbon atoms of $R^1$ and $R^2$, the total content of a compound having a total number of carbon atoms of $R^1$ and $R^2$ of 14 and a compound having a total number of carbon atoms of $R^1$ and $R^2$ of 16 is, in the whole precursor compound, preferably 75 mass % or more, more preferably 85 mass % or more, further preferably 95 mass % or more, still further preferably 100 mass %.

When the precursor compound includes two or more compounds that have a same total number of carbon atoms of $R^1$, $R^2$, and X, but are different in number of carbon atoms of each of $R^1$ and $R^2$, the content proportion of a compound in which $R^1$ has 5 or more carbon atoms and $R^2$ has 5 or more carbon atoms is, in the whole precursor compound, preferably 10 mass % or more, more preferably 20 mass % or more, further preferably 30 mass % or more, and preferably 90 mass % or less, more preferably 80 mass % or less, further preferably 70 mass % or less.

The method for producing the precursor compound is not particularly limited, and the precursor compound can be produced, for example, by oxidizing a double bond of an internal olefin with a peroxide such as hydrogen peroxide and peracetic acid to synthesize an internal epoxide, and adding to the obtained internal epoxide glycol having 4 or more and 18 or less carbon atoms, or a both-terminal alkanediol having 3 or more and 8 or less carbon atoms. When the internal olefin is a mixed product of two or more internal olefins that have a same total number of carbon atoms but a double bond at different positions therebetween, the precursor compound obtained by the above-described production method is a mixed product of two or more compounds that have a same total number of carbon atoms of $R^1$, $R^2$, and X, but are different in number of carbon atoms of each of $R^1$ and $R^2$.

The internal olefin used for the production of the precursor compound may contain a terminal olefin. In such a case, the content of the terminal olefin included in the olefin is, for example, 0.1 mass % or more, 0.2 mass % or more, and 5 mass % or less, 3 mass % or less, 2 mass % or less, 1 mass % or less, 0.5 mass % or less.

<Surfactant Composition>

A surfactant composition according to the present invention contains at least the internal two hydrophilic groups-containing compound.

The content of the internal two hydrophilic groups-containing compound in the surfactant composition is not particularly limited, but is preferably 50 mass % or more, more preferably 60 mass % or more, further preferably 70 mass % or more, still further preferably 80 mass % or more from the viewpoint of reducing transportation and storage costs, and is preferably 99 mass % or less, more preferably 95 mass % or less, further preferably 90 mass % or less from the viewpoint of prevention of gelation.

The surfactant composition according to the present invention preferably contains water from the viewpoint of easiness of handling. The water is not particularly limited, but is preferably purified water such as ion-exchanged water, distilled water, and reverse osmosis water.

The water can be used in the amount corresponding to the balance other than the internal two hydrophilic groups-containing compound and the other components. The content of the water in the composition can be set to 1 mass % or more, 5 mass % or more, 10 mass % or more, and can be set to 50 mass % or less, 40 mass % or less, 30 mass % or less, 20 mass % or less.

The surfactant composition according to the present invention can contain a surfactant or a solvent described below from the viewpoint of storage stability.

The addition of the solvent described below to the surfactant composition according to the present invention is not limited. From the viewpoints of sustainability, environmental burden, safety, and the like, however, the content of the solvent in the surfactant composition is preferably 10 mass % or less, more preferably 4 mass % or less, further preferably 1 mass % or less, still further preferably 0.1 mass % or less, still further preferably 0 mass %. That is, the surfactant composition preferably contains no solvent.

The surfactant composition may be an emulsifier composition, a wetting agent composition, or a penetrant composition. That is, the surfactant composition according to the present invention may be an emulsifier composition, a wetting agent composition, or a penetrant composition containing one or more compounds represented by the chemical formula (1).

<Detergent Composition>

A detergent composition according to the present invention contains at least the internal two hydrophilic groups-containing compound.

The content of the internal two hydrophilic groups-containing compound in the detergent composition is not particularly limited, but is preferably 0.5 mass % or more, more preferably 10 mass % or more, further preferably 30 mass % or more, still further preferably 40 mass % or more from the viewpoint of improving detergency, and is preferably 99 mass % or less, more preferably 90 mass % or less, further preferably 80 mass % or less from the viewpoint of low-concentration detergency and prevention of gelation.

The detergent composition according to the present invention can contain any component used for detergents, such as a surfactant different from the internal two hydrophilic groups-containing compound, water, a solvent, fragrance, a dye, a defoamer, a preservative, a moisturizing agent, an antibacterial agent, an antidandruff agent, a pearlizing agent, a vitamin compound, a thickener, a pH adjuster, a bleacher, a chelating agent, a water-soluble salt, and an oil solution, as long as the component does not inhibit the effects of the present invention.

As the surfactant different from the internal two hydrophilic groups-containing compound, known surfactants can be used without any limitation. Examples of the surfactant include an anionic surfactant, a nonionic surfactant, an amphoteric surfactant, and a cationic surfactant.

The water is not particularly limited, but is preferably purified water such as ion-exchanged water, distilled water, and reverse osmosis water.

The water can be used in the amount corresponding to the balance other than the internal two hydrophilic groups-containing compound and the other components. The content of the water in the composition can be set to 1 mass % or more, 10 mass % or more, 20 mass % or more, 30 mass % or more, 40 mass % or more, 50 mass % or more, and can be set to 99.5 mass % or less, 90 mass % or less, 70 mass % or less, 60 mass % or less, 50 mass % or less, 40 mass % or less, 30 mass % or less, 20 mass % or less, 10 mass % or less, 5 mass % or less, 0 mass %.

The detergent composition according to the present invention can contain a solvent in order to, for example, increase low-temperature stability and washing performance.

The addition of the solvent described above to the detergent composition according to the present invention is not limited. From the viewpoints of sustainability, environmental burden, safety, and the like, however, the content of the solvent in the detergent composition is preferably 10 mass % or less, more preferably 4 mass % or less, further preferably 1 mass % or less, still further preferably 0.1 mass % or less, still further preferably 0 mass %. That is, the detergent composition preferably contains no solvent.

The detergent composition according to the present invention can be prepared, for example, by mixing the internal two hydrophilic groups-containing compound and a component other than the compound.

When the detergent composition containing another component is prepared, the preparation order is not particularly limited, and the detergent composition may be prepared by preparing a detergent composition containing the internal two hydrophilic groups-containing compound and then blending the other component in the detergent composition.

From the viewpoint of obtaining the detergent composition having the components uniformly dissolved therein, the detergent composition is preferably left to stand still at a prescribed temperature for a prescribed time after mixing. The temperature at which the detergent composition is left to stand still is preferably 10° C. or more, more preferably 15° C. or more, further preferably 20° C. or more, still further preferably 25° C. or more from the viewpoint of obtaining the detergent composition having the components uniformly dissolved therein, and is preferably 80° C. or less, more preferably 70° C. or less, further preferably 60° C. or less, still further preferably 50° C. or less, still further preferably 40° C. or less, still further preferably 30° C. or less from the viewpoint of economic efficiency. The time during which the detergent composition is left to stand still depends on the temperature, but is preferably 1 hour or more, more preferably 5 hours or more, further preferably 12 hours or more, still further preferably 18 hours or more, still further preferably 24 hours or more, still further preferably 2 days or more, still further preferably 3 days or more from the viewpoint of sufficiently uniformly dissolving the components, and is preferably 1 month or less, more preferably 20 days or less, further preferably 10 days or less from the viewpoint of economic efficiency.

The surfactant composition or the detergent composition according to the present invention is used as a detergent such as a laundry liquid detergent, a dishwashing detergent, shampoo, a body cleanser, a detergent for precision components, and a detergent for hard surfaces.

The surfactant composition or the detergent composition according to the present invention can be added and dissolved in water and thereby applied to various washing uses described above.

The present invention and preferred embodiments of the present invention are described below.

<1>

A compound represented by a chemical formula (1) below:

[Chemical Formula (1)]

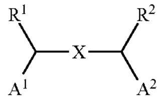

wherein $R^1$ and $R^2$ are each an aliphatic hydrocarbon group, X is a single bond or a hydrocarbon group having 1 or more and 5 or less carbon atoms, a total number of carbon atoms of $R^1$, $R^2$, and X is 2 or more and 39 or less, $A^1$ is $—O(-A^{11}O)_m—H$ or $—O(-A^{12}O)_p—H$, $A^2$ is $—O—R^3O(-A^{21}O)_n—H$ or $—O(-A^{22}O)_{q+1}—H$, $R^3$ is an alkanediyl group having 4 or more and 18 or less carbon atoms, m pieces of $A^{11}$ and n pieces of $A^{21}$ are each independently an alkanediyl group having 2 or more and 3 or less carbon atoms, p pieces of $A^{12}$ and q+1 pieces of $A^{22}$ are each independently an alkanediyl group having 2 or more and 8 or less carbon atoms, at least one piece of $A^{22}$ among the q+1 pieces of $A^{22}$ is a linear alkane-α,ω-diyl group having 3 or more and 8 or less carbon atoms, m, n, p, and q are an average value and are each independently 0 or more, a total of m and n is more than 0 and 50 or less, and a total of p and q is more than 0 and 50 or less.

<2>

The compound according to <1>, wherein $R^1$ and $R^2$ are each preferably a linear or branched alkyl group, more preferably a linear alkyl group, further preferably a linear primary alkyl group.

<3>

The compound according to <1> or <2>, wherein $R^1$ and $R^2$ each independently have 1 or more and 33 or less carbon atoms.

<4>

The compound according to any one of <1> to <3>, wherein $R^1$ and $R^2$ are a same aliphatic hydrocarbon group or different aliphatic hydrocarbon groups.

<5>

The compound according to any one of <1> to <4>, wherein X is preferably a single bond or a hydrocarbon group having 1 or more and 3 or less carbon atoms, more preferably a single bond or a hydrocarbon group having 1 or more and 2 or less carbon atoms, further preferably a single bond or a hydrocarbon group having 1 carbon atom, still further preferably a single bond.

<6>

The compound according to any one of <1> to <4>, wherein X is a single bond.

<7>

The compound according to any one of <1> to <4>, wherein X is a hydrocarbon group having 1 or more and 5 or less carbon atoms.

<8>

The compound according to <7>, wherein the hydrocarbon group is preferably a linear or branched alkanediyl group, more preferably a linear alkanediyl group, further preferably a linear α,ω-alkanediyl group.

<9>

The compound according to any one of <1> to <8>, wherein the total number of carbon atoms of $R^1$, $R^2$, and X is preferably 10 or more, more preferably 12 or more, further preferably 14 or more, and is preferably 20 or less, more preferably 18 or less, further preferably 16 or less.

<10>

The compound according to any one of <1> to <8>, wherein the total number of carbon atoms of $R^1$, $R^2$, and X is 10 or more and 20 or less.

<11>

The compound according to any one of <1> to <8>, wherein the total number of carbon atoms of $R^1$, $R^2$, and X is 12 or more and 18 or less.

<12>

The compound according to any one of <1> to <8>, wherein the total number of carbon atoms of $R^1$, $R^2$, and X is 14 or more and 16 or less.

<13>

The compound according to any one of <1> to <12>, wherein the total number of carbon atoms of $R^1$, $R^2$, and X is even.

<14>

The compound according to any one of <1> to <13>, wherein the compound represented by the chemical formula (1) includes two or more compounds that have a same total number of carbon atoms of $R^1$, $R^2$, and X, but are different in number of carbon atoms of each of $R^1$ and $R^2$.

<15>

The compound according to any one of <1> to <13>, wherein the compound represented by the chemical formula (1) includes two or more compounds that have a single bond or a hydrocarbon group having 1 or more and 5 or less carbon atoms as X and a same total number of carbon atoms of $R^1$, $R^2$, and X, but are different in number of carbon atoms of each of $R^1$ and $R^2$.

<16>

The compound according to any one of <1> to <13>, wherein the compound represented by the chemical formula (1) includes two or more compounds that have a single bond or a hydrocarbon group having 1 or more and 3 or less carbon atoms as X and a same total number of carbon atoms of $R^1$, $R^2$, and X, but are different in number of carbon atoms of each of $R^1$ and $R^2$.

<17>

The compound according to any one of <1> to <13>, wherein the compound represented by the chemical formula (1) includes two or more compounds that have a single bond or a hydrocarbon group having 1 or more and 2 or less carbon atoms as X and a same total number of carbon atoms of $R^1$, $R^2$, and X, but are different in number of carbon atoms of each of $R^1$ and $R^2$.

<18>

The compound according to any one of <1> to <13>, wherein the compound represented by the chemical formula (1) includes two or more compounds that have a single bond or a hydrocarbon group having 1 carbon atom as X and a same total number of carbon atoms of $R^1$, $R^2$, and X, but are different in number of carbon atoms of each of $R^1$ and $R^2$.

<19>

The compound according to any one of <1> to <13>, wherein the compound represented by the chemical formula (1) includes two or more compounds that have a single bond as X and a same total number of carbon atoms of $R^1$, $R^2$, and X, but are different in number of carbon atoms of each of $R^1$ and $R^2$.

<20>

The compound according to any one of <1> to <13>, wherein when the compound represented by the chemical formula (1) includes two or more compounds that have a single bond as X, and are different in total number of carbon atoms of $R^1$ and $R^2$, the total content of a compound having a total number of carbon atoms of $R^1$ and $R^2$ of 14 and a compound having a total number of carbon atoms of $R^1$ and $R^2$ of 16 is, in the whole compound represented by the chemical formula (1), preferably 75 mass % or more, more preferably 85 mass % or more, further preferably 95 mass % or more, still further preferably 100 mass %.

<21>

The compound according to any one of <1> to <13>, wherein when the compound represented by the chemical formula (1) includes two or more compounds that have a same total number of carbon atoms of $R^1$, $R^2$, and X, but are different in number of carbon atoms of each of $R^1$ and $R^2$, the content proportion of a compound in which $R^1$ has 5 or more carbon atoms and $R^2$ has 5 or more carbon atoms is, in the whole compound represented by the chemical formula (1), preferably 10 mass % or more, more preferably 20 mass % or more, further preferably 30 mass % or more, and preferably 90 mass % or less, more preferably 80 mass % or less, further preferably 70 mass % or less.

<22>

The compound according to any one of <1> to <13>, wherein when the compound represented by the chemical formula (1) includes two or more compounds that have a same total number of carbon atoms of $R^1$, $R^2$, and X, but are different in number of carbon atoms of each of $R^1$ and $R^2$, the content proportion of a compound in which $R^1$ has 5 or more carbon atoms and $R^2$ has 5 or more carbon atoms is, in the whole compound represented by the chemical formula (1), 10 mass % or more and 90 mass % or less.

<23>

The compound according to any one of <1> to <13>, wherein when the compound represented by the chemical formula (1) includes two or more compounds that have a same total number of carbon atoms of $R^1$, $R^2$, and X, but are different in number of carbon atoms of each of $R^1$ and $R^2$, the content proportion of a compound in which $R^1$ has 5 or more carbon atoms and $R^2$ has 5 or more carbon atoms is, in the whole compound represented by the chemical formula (1), 20 mass % or more and 80 mass % or less.

<24>

The compound according to any one of <1> to <13>, wherein when the compound represented by the chemical formula (1) includes two or more compounds that have a same total number of carbon atoms of $R^1$, $R^2$, and X, but are different in number of carbon atoms of each of $R^1$ and $R^2$, the content proportion of a compound in which $R^1$ has 5 or more carbon atoms and $R^2$ has 5 or more carbon atoms is, in the whole compound represented by the chemical formula (1), 30 mass % or more and 70 mass % or less.

<25>

The compound according to any one of <1> to <24>, wherein the alkanediyl group as $R^3$ is preferably a linear alkanediyl group, more preferably a linear alkane-α,ω-diyl group, and further preferably a butane-1,4-diyl group or a hexane-1,6-diyl group.

<26>

The compound according to any one of <1> to <25>, wherein the number of carbon atoms of the alkanediyl group as $R^3$ is 4 or more and 12 or less.

<27>

The compound according to any one of <1> to <25>, wherein the number of carbon atoms of the alkanediyl group as $R^3$ is 4 or more and 8 or less.

<28>

The compound according to any one of <1> to <25>, wherein the number of carbon atoms of the alkanediyl group as $R^3$ is 4 or more and 6 or less.

<29>

The compound according to any one of <1> to <28>, wherein $A^{11}$ and $A^{21}$ are each independently an alkanediyl group having 2 or more and 3 or less carbon atoms.

<30>

The compound according to any one of <1> to <29>, wherein the alkanediyl group of $A^{11}$ and $A^{21}$ are preferably a 1,2-alkanediyl group, more preferably one or more selected from an ethanediyl group and a 1,2-propanediyl group, and further preferably an ethanediyl group.

<31>

The compound according to any one of <1> to <30>, wherein $A^{11}O$ and $A^{21}O$ are each an alkyleneoxy group, the alkyleneoxy group is specifically an ethyleneoxy group, or a branched propyleneoxy group.

<32>

The compound according to any one of <1> to <31>, wherein when m pieces of $A^{11}O$ or n pieces of $A^{21}O$ include two or more types of the alkyleneoxy groups, the alkyleneoxy groups are preferably an ethyleneoxy group and a branched propyleneoxy group.

<33>

The compound according to any one of <1> to <32>, wherein when m pieces of $A^{11}O$ or n pieces of $A^{21}O$ include an ethyleneoxy group and a branched propyleneoxy group, the molar ratio (ethyleneoxy group/branched propyleneoxy group) of the ethyleneoxy group to the branched propyleneoxy group is preferably 2/1 or more, more preferably 4/1 or more, and is preferably 100/1 or less, more preferably 20/1 or less, further preferably 15/1 or less.

<34>

The compound according to any one of <1> to <32>, wherein when m pieces of $A^{11}O$ or n pieces of $A^{21}O$ include an ethyleneoxy group and a branched propyleneoxy group, the molar ratio (ethyleneoxy group/branched propyleneoxy group) of the ethyleneoxy group to the branched propyleneoxy group is 2/1 to 100/1.

<35>

The compound according to any one of <1> to <32>, wherein when m pieces of $A^{11}O$ or n pieces of $A^{21}O$ include an ethyleneoxy group and a branched propyleneoxy group, the molar ratio (ethyleneoxy group/branched propyleneoxy group) of the ethyleneoxy group to the branched propyleneoxy group is 2/1 to 20/1.

<36>

The compound according to any one of <1> to <32>, wherein when m pieces of $A^{11}O$ or n pieces of $A^{21}O$ include an ethyleneoxy group and a branched propyleneoxy group, the molar ratio (ethyleneoxy group/branched propyleneoxy group) of the ethyleneoxy group to the branched propyleneoxy group is 2/1 to 15/1.

<37>

The compound according to any one of <1> to <32>, wherein when m pieces of $A^{11}O$ or n pieces of $A^{21}O$ include an ethyleneoxy group and a branched propyleneoxy group, the molar ratio (ethyleneoxy group/branched propyleneoxy group) of the ethyleneoxy group to the branched propyleneoxy group is 4/1 to 15/1.

<38>

The compound according to any one of <1> to <37>, wherein when m pieces of $A^{11}O$ or n pieces of $A^{21}O$ include two or more types of the alkyleneoxy groups, the repeating structure of the alkyleneoxy groups include preferably a block structure, more preferably an EO block-PO block structure, a PO block-EO block structure, an EO block-PO block-EO block structure, or a PO block-EO block-PO block structure, further preferably an EO block-PO block-EO block structure.

<39>

The compound according to any one of <1> to <38>, wherein the total of m and n is preferably 3 or more, more preferably 5 or more, further preferably 8 or more, still further preferably 10 or more, and is preferably 40 or less, more preferably 30 or less, further preferably 25 or less, still further preferably 20 or less.

<40>

The compound according to any one of <1> to <38>, wherein the total of m and n is 3 or more and 40 or less.

<41>

The compound according to any one of <1> to <38>, wherein the total of m and n is 5 or more and 30 or less.

<42>

The compound according to any one of <1> to <38>, wherein the total of m and n is 8 or more and 25 or less.

<43>

The compound according to any one of <1> to <38>, wherein the total of m and n is 10 or more and 20 or less.

<44>

The compound according to any one of <1> to <43>, wherein the alkanediyl group of $A^{12}$ and $A^{22}$ are preferably a 1,2-alkanediyl group, more preferably one or more selected from an ethanediyl group and a 1,2-propanediyl group, and further preferably an ethanediyl group.

<45>

The compound according to any one of <1> to <44>, wherein the alkanediyl group of $A^{12}$ and $A^{22}$ have preferably 2 or more and 6 or less carbon atoms, more preferably 2 or more and 5 or less carbon atoms, further preferably 2 or more and 4 or less carbon atoms.

<46>

The compound according to any one of <1> to <45>, wherein $A^{12}O$ and $A^{22}O$ are an alkyleneoxy group, and the alkyleneoxy group is preferably an ethyleneoxy group or a branched alkyleneoxy group having 3 or more and 8 or less carbon atoms.

<47>

The compound according to any one of <1> to <46>, wherein when p pieces of $A^{21}O$ or q+1 pieces of $A^{22}O$ include two or more types of the alkyleneoxy groups, the alkyleneoxy groups are preferably an ethyleneoxy group and one or more types of branched alkyleneoxy groups having 3 or more and 8 or less carbon atoms, more preferably an ethyleneoxy group and a branched propyleneoxy group.

<48>

The compound according to any one of <1> to <47>, wherein when p pieces of $A^{21}O$ or q+1 pieces of $A^{22}O$ include an ethyleneoxy group and one or more types of branched alkyleneoxy groups having 3 or more and 8 or less carbon atoms (or a branched propyleneoxy group), the molar ratio (ethyleneoxy group/branched alkyleneoxy group having 3 or more and 8 or less carbon atoms (or branched propyleneoxy group) of the ethyleneoxy group to the branched alkyleneoxy group having 3 or more and 8 or less carbon atoms (or the branched propyleneoxy group) is preferably 2/1 or more, more preferably 4/1 or more, and is preferably 100/1 or less, more preferably 20/1 or less, further preferably 15/1 or less.

<49>

The compound according to any one of <1> to <47>, wherein when p pieces of $A^{12}O$ or q+1 pieces of $A^{22}O$ include an ethyleneoxy group and one or more types of branched alkyleneoxy groups having 3 or more and 8 or less carbon atoms (or a branched propyleneoxy group), the molar ratio (ethyleneoxy group/branched alkyleneoxy group having 3 or more and 8 or less carbon atoms (or branched propyleneoxy group) of the ethyleneoxy group to the branched alkyleneoxy group having 3 or more and 8 or less carbon atoms (or the branched propyleneoxy group) is 2/1 or more and 100/1 or less.

<50>

The compound according to any one of <1> to <47>, wherein when p pieces of $A^{21}O$ or q+1 pieces of $A^{22}O$ include an ethyleneoxy group and one or more types of branched alkyleneoxy groups having 3 or more and 8 or less carbon atoms (or a branched propyleneoxy group), the molar ratio (ethyleneoxy group/branched alkyleneoxy group having 3 or more and 8 or less carbon atoms (or branched propyleneoxy group) of the ethyleneoxy group to the branched alkyleneoxy group having 3 or more and 8 or less carbon atoms (or the branched propyleneoxy group) is 2/1 to 20/1.

<51>

The compound according to any one of <1> to <47>, wherein when p pieces of $A^{12}O$ or q+1 pieces of $A^{22}O$ include an ethyleneoxy group and one or more types of branched alkyleneoxy groups having 3 or more and 8 or less carbon atoms (or a branched propyleneoxy group), the molar ratio (ethyleneoxy group/branched alkyleneoxy group having 3 or more and 8 or less carbon atoms (or branched propyleneoxy group) of the ethyleneoxy group to the branched alkyleneoxy group having 3 or more and 8 or less carbon atoms (or the branched propyleneoxy group) is 2/1 to 15/1.

<52>

The compound according to any one of <1> to <47>, wherein when p pieces of $A^{21}O$ or q+1 pieces of $A^{22}O$ include an ethyleneoxy group and one or more types of branched alkyleneoxy groups having 3 or more and 8 or less carbon atoms (or a branched propyleneoxy group), the molar ratio (ethyleneoxy group/branched alkyleneoxy group having 3 or more and 8 or less carbon atoms (or branched propyleneoxy group) of the ethyleneoxy group to the branched alkyleneoxy group having 3 or more and 8 or less carbon atoms (or the branched propyleneoxy group) is 4/1 to 15/1.

<53>

The compound according to any one of <1> to <52>, wherein when p pieces of $A^{12}O$ or q+1 pieces of $A^{22}O$ include two or more types of the alkyleneoxy groups, the repeating structure of the alkyleneoxy groups include preferably a block structure, more preferably an EO block-PO block structure, a PO block-EO block structure, an EO block-PO block-EO block structure, or a PO block-EO block-PO block structure, further preferably an EO block-PO block-EO block structure.

<54>

The compound according to any one of <1> to <53>, wherein the linear alkane-α,ω-diyl group has 3 or more and 6 or less carbon atoms.

<55>

The compound according to any one of <1> to <53>, wherein the linear alkane-α,ω-diyl group has 3 or more and 5 or less carbon atoms.

<56>

The compound according to any one of <1> to <53>, wherein the linear alkane-α,ω-diyl group has 3 or more and 4 or less carbon atoms.

<57>

The compound according to any one of <1> to <56>, wherein $A^2$ is $—O—R^3O(-A^{21}O)_n—H$ or $—O-A^{221}O(-A^{22}O)_q—H$, and at least $A^{221}$ is a linear alkane-α,ω-diyl group having 3 or more and 8 or less carbon atoms.

<58>

The compound according to any one of <1> to <57>, wherein the content of the linear alkane-α,ω-diyl group having 3 or more and 8 or less carbon atoms is, on average per molecule, preferably 1 mol or more, and preferably 5 mol or less, more preferably 3 mol or less, further preferably 2 mol or less.

<59>

The compound according to any one of <1> to <57>, wherein the content of the linear alkane-α,ω-diyl group having 3 or more and 8 or less carbon atoms is, on average per molecule, 1 mol or more and 5 mol or less.

<60>

The compound according to any one of <1> to <57>, wherein the content of the linear alkane-α,ω-diyl group having 3 or more and 8 or less carbon atoms is, on average per molecule, 1 mol or more and 3 mol or less.

<61>

The compound according to any one of <1> to <57>, wherein the content of the linear alkane-α,ω-diyl group having 3 or more and 8 or less carbon atoms is, on average per molecule, 1 mol or more and 2 mol or less.

<62>

The compound according to any one of <1> to <61>, wherein the total of p and q is preferably 3 or more, more preferably 5 or more, further preferably 8 or more, still further preferably 10 or more, and is preferably 40 or less, more preferably 30 or less, further preferably 25 or less, still further preferably 20 or less.

<63>

The compound according to any one of <1> to <61>, wherein the total of p and q is 3 or more and 40 or less.

<64>

The compound according to any one of <1> to <61>, wherein the total of p and q is 5 or more and 30 or less.

<65>

The compound according to any one of <1> to <61>, wherein the total of p and q is 8 or more and 25 or less.

<66>

The compound according to any one of <1> to <61>, wherein the total of p and q is 10 or more and 20 or less.

<67>

A precursor compound for producing the compound according to any one of <1> to <66>, the precursor compound being represented by a chemical formula (2) below:

[Chemical Formula (2)]

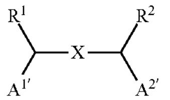

wherein $R^1$ and $R^2$ are each an aliphatic hydrocarbon group, X is a single bond or a hydrocarbon group having 1 or more and 5 or less carbon atoms, a total number of carbon atoms of $R^1$, $R^2$, and X is 2 or more and 39 or less, $A^{1'}$ is —OH, $A^{2'}$ is $—O—R^3OH$ or $—O-A^{221}OH$, $R^3$ is an alkanediyl group having 4 or more and 18 or less carbon atoms, and $A^{221}$ is a linear alkane-α,ω-diyl group having 3 or more and 8 or less carbon atoms.

<68>

The precursor compound according to <67>, wherein $R^1$ and $R^2$ are each preferably a linear or branched alkyl group, more preferably a linear alkyl group, further preferably a linear primary alkyl group.

<69>

The precursor compound according to <67> or <68>, wherein $R^1$ and $R^2$ each independently have 1 or more and 33 or less carbon atoms.

<70>

The precursor compound according to any one of <67> to <69>, wherein $R^1$ and $R^2$ are a same aliphatic hydrocarbon group or different aliphatic hydrocarbon groups.

<71>

The precursor compound according to any one of <67> to <70>, wherein X is preferably a single bond or a hydrocarbon group having 1 or more and 3 or less carbon atoms, more preferably a single bond or a hydrocarbon group having 1 or more and 2 or less carbon atoms, further preferably a single bond or a hydrocarbon group having 1 carbon atom, still further preferably a single bond.

<72>

The precursor compound according to any one of <67> to <71>, wherein X is a single bond.

<73>

The precursor compound according to any one of <67> to <71>, wherein X is a hydrocarbon group having 1 or more and 5 or less carbon atoms.

<74>

The precursor compound according to <73>, wherein the hydrocarbon group is preferably a linear or branched alkanediyl group, more preferably a linear alkanediyl group, further preferably a linear α,ω-alkanediyl group.

<75>

The precursor compound according to any one of <67> to <74>, wherein the total number of carbon atoms of $R^1$, $R^2$, and X is preferably 10 or more, more preferably 12 or more, further preferably 14 or more, and is preferably 20 or less, more preferably 18 or less, further preferably 16 or less.

<76>

The precursor compound according to any one of <67> to <74>, wherein the total number of carbon atoms of $R^1$, $R^2$, and X is 10 or more and 20 or less.

<77>

The precursor compound according to any one of <67> to <74>, wherein the total number of carbon atoms of $R^1$, $R^2$, and X is 12 or more and 18 or less.

<78>

The precursor compound according to any one of <67> to <74>, wherein the total number of carbon atoms of $R^1$, $R^2$, and X is 14 or more and 16 or less.

<79>

The precursor compound according to any one of <67> to <78>, wherein the total number of carbon atoms of $R^1$, $R^2$, and X is even.

<80>

The precursor compound according to any one of <67> to <79>, wherein $A^{221}$ has 3 or more and 8 or less carbon atoms.

<81>

The precursor compound according to any one of <67> to <79>, wherein $A^{221}$ has 3 or more and 6 or less carbon atoms.

<82>

The precursor compound according to any one of <67> to <79>, wherein $A^{221}$ has 3 or more and 5 or less carbon atoms.

<83>

The precursor compound according to any one of <67> to <79>, wherein $A^{221}$ has 3 or 4 carbon atoms.

<84>

The precursor compound according to any one of <67> to <83>, wherein the compound represented by the chemical formula (2) includes two or more compounds that have a same total number of carbon atoms of $R^1$, $R^2$, and X, but are different in number of carbon atoms of each of $R^1$ and $R^2$.

<85>

The precursor compound according to any one of <67> to <83>, wherein the compound represented by the chemical formula (2) includes two or more compounds that have a single bond or a hydrocarbon group having 1 or more and 5 or less carbon atoms as X and a same total number of carbon atoms of $R^1$, $R^2$, and X, but are different in number of carbon atoms of each of $R^1$ and $R^2$.

<86>

The precursor compound according to any one of <67> to <83>, wherein the compound represented by the chemical formula (2) includes two or more compounds that have a single bond or a hydrocarbon group having 1 or more and 3 or less carbon atoms as X and a same total number of carbon atoms of $R^1$, $R^2$, and X, but are different in number of carbon atoms of each of $R^1$ and $R^2$.

<87>

The precursor compound according to any one of <67> to <83>, wherein the compound represented by the chemical formula (2) includes two or more compounds that have a single bond or a hydrocarbon group having 1 or more and 2 or less carbon atoms as X and a same total number of carbon atoms of $R^1$, $R^2$, and X, but are different in number of carbon atoms of each of $R^1$ and $R^2$.

<88>

The precursor compound according to any one of <67> to <83>, wherein the compound represented by the chemical formula (2) includes two or more compounds that have a single bond or a hydrocarbon group having 1 carbon atom as X and a same total number of carbon atoms of $R^1$, $R^2$, and X, but are different in number of carbon atoms of each of $R^1$ and $R^2$.

<89>

The precursor compound according to any one of <67> to <83>, wherein the compound represented by the chemical formula (2) includes two or more compounds that have a single bond as X and a same total number of carbon atoms of $R^1$, $R^2$, and X, but are different in number of carbon atoms of each of $R^1$ and $R^2$.

<90>

The precursor compound according to any one of <67> to <83>, wherein when the compound represented by the chemical formula (2) includes two or more compounds that have a single bond as X, and are different in total number of carbon atoms of $R^1$ and $R^2$, the total content of a compound having a total number of carbon atoms of $R^1$ and $R^2$ of 14 and a compound having a total number of carbon atoms of $R^1$ and $R^2$ of 16 is, in the whole compound represented by the chemical formula (2), preferably 75 mass % or more, more preferably 85 mass % or more, further preferably 95 mass % or more, still further preferably 100 mass %.

<91>

The precursor compound according to any one of <67> to <83>, wherein when the compound represented by the chemical formula (2) includes two or more compounds that have a same total number of carbon atoms of $R^1$, $R^2$, and X, but are different in number of carbon atoms of each of $R^1$ and $R^2$, the content proportion of a compound in which $R^1$ has 5 or more carbon atoms and $R^2$ has 5 or more carbon atoms is, in the whole compound represented by the chemical formula (2), preferably 10 mass % or more, more preferably 20 mass % or more, further preferably 30 mass % or more, and preferably 90 mass % or less, more preferably 80 mass % or less, further preferably 70 mass % or less.

<92>

The precursor compound according to any one of <67> to <83>, wherein when the compound represented by the chemical formula (2) includes two or more compounds that have a same total number of carbon atoms of $R^1$, $R^2$, and X, but are different in number of carbon atoms of each of $R^1$ and $R^2$, the content proportion of a compound in which $R^1$ has 5 or more carbon atoms and $R^2$ has 5 or more carbon atoms is, in the whole compound represented by the chemical formula (2), 10 mass % or more and 90 mass % or less.

<93>

The precursor compound according to any one of <67> to <83>, wherein when the compound represented by the chemical formula (2) includes two or more compounds that have a same total number of carbon atoms of $R^1$, $R^2$, and X, but are different in number of carbon atoms of each of $R^1$ and $R^2$, the content proportion of a compound in which $R^1$ has 5 or more carbon atoms and $R^2$ has 5 or more carbon atoms is, in the whole compound represented by the chemical formula (2), 20 mass % or more and 80 mass % or less.

<94>

The precursor compound according to any one of <67> to <83>, wherein when the compound represented by the chemical formula (2) includes two or more compounds that have a same total number of carbon atoms of $R^1$, $R^2$, and X, but are different in number of carbon atoms of each of $R^1$ and $R^2$, the content proportion of a compound in which $R^1$ has 5 or more carbon atoms and $R^2$ has 5 or more carbon atoms is, in the whole compound represented by the chemical formula (2), 30 mass % or more and 70 mass % or less.

<95>

The precursor compound according to any one of <67> to <94>, wherein the alkanediyl group as $R^3$ is preferably a linear alkanediyl group, more preferably a linear alkane-α,ω-diyl group, and further preferably a butane-1,4-diyl group or a hexane-1,6-diyl group.

<96>

The precursor compound according to any one of <67> to <94>, wherein the number of carbon atoms of the alkanediyl group as $R^3$ is 4 or more and 12 or less.

<97>

The precursor compound according to any one of <67> to <94>, wherein the number of carbon atoms of the alkanediyl group as $R^3$ is 4 or more and 8 or less.

<98>

The precursor compound according to any one of <67> to <94>, wherein the number of carbon atoms of the alkanediyl group as $R^3$ is 4 or more and 6 or less.

<99>

A surfactant composition containing the compound according to any one of <1> to <98>.

<100>

The surfactant composition according to <99>, wherein the content of the compound represented by the chemical formula (1) in the surfactant composition is preferably 50 mass % or more, more preferably 60 mass % or more, further preferably 70 mass % or more, still further preferably 80 mass % or more, and is preferably 99 mass % or less, more preferably 95 mass % or less, further preferably 90 mass % or less.

<101>

The surfactant composition according to <99>, wherein the content of the compound represented by the chemical formula (1) in the surfactant composition is 50 mass % or more and 99 mass % or less.

<102>

The surfactant composition according to <99>, wherein the content of the compound represented by the chemical formula (1) in the surfactant composition is 60 mass % or more and 95 mass % or less.

<103>

The surfactant composition according to <99>, wherein the content of the compound represented by the chemical formula (1) in the surfactant composition is 70 mass % or more and 90 mass % or less.

<104>

The surfactant composition according to <99>, wherein the content of the compound represented by the chemical formula (1) in the surfactant composition is 80 mass % or more and 90 mass % or less.

<105>

The surfactant composition according to any one of <99> to <104>, wherein the surfactant composition contains water.

<106>

The surfactant composition according to <105>, wherein the water is preferably purified water, and more preferably ion-exchanged water, distilled water, or reverse osmosis water.

<107>

The surfactant composition according to <105> or <106>, wherein the content of the water in the surfactant composition is 1 mass % or more, 5 mass % or more, or 10 mass % or more, and is 50 mass % or less, 40 mass % or less, 30 mass % or less, or 20 mass % or less.

<108>

The surfactant composition according to any one of <99> or <107>, wherein the surfactant composition contains a surfactant different from the compound represented by the chemical formula (1) or a solvent.

<109>

The surfactant composition according to <108>, wherein the content of the solvent in the surfactant composition is preferably 10 mass % or less, more preferably 4 mass % or less, further preferably 1 mass % or less, still further preferably 0.1 mass % or less.

<110>

The surfactant composition according to any one of <99> or <109>, wherein the surfactant composition is an emulsifier composition, a wetting agent composition, or a penetrant composition.

<111>

A detergent composition containing the compound according to any one of <1> to <98>.

<112>

The detergent composition according to <111>, wherein the content of the compound represented by the chemical formula (1) in the detergent composition is preferably 0.5 mass % or more, more preferably 10 mass % or more, further preferably 30 mass % or more, still further preferably 40 mass % or more, and is preferably 99 mass % or less, more preferably 90 mass % or less, further preferably 80 mass % or less.

<113>

The detergent composition according to <111>, wherein the content of the compound represented by the chemical formula (1) in the detergent composition is 0.5 mass % or more and 99 mass % or less.

<114>

The detergent composition according to <111>, wherein the content of the compound represented by the chemical formula (1) in the detergent composition is 10 mass % or more and 90 mass % or less.

<115>

The detergent composition according to <111>, wherein the content of the compound represented by the chemical formula (1) in the detergent composition is 30 mass % or more and 80 mass % or less.

<116>

The detergent composition according to <111>, wherein the content of the compound represented by the chemical formula (1) in the detergent composition is 40 mass % or more and 80 mass % or less.

<117>

The detergent composition according to any one of <111> to <116>, wherein the detergent composition contains a surfactant different from the compound represented by the chemical formula (1).

<118>

The detergent composition according to any one of <111> to <117>, wherein the detergent composition contains water.

<119>

The detergent composition according to <118>, wherein the water is preferably purified water, and more preferably ion-exchanged water, distilled water, or reverse osmosis water.

<120>

The detergent composition according to <118> or <119>, wherein the content of the water in the detergent composition is 1 mass % or more, 10 mass % or more, 20 mass % or more, 30 mass % or more, 40 mass % or more, 50 mass % or more, and is 99.5 mass % or less, 90 mass % or less, 70 mass % or less, 60 mass % or less, 50 mass % or less, 40 mass % or less, 30 mass % or less, 20 mass % or less, 10 mass % or less, 5 mass % or less.

<121>

The detergent composition according to any one of <111> to <120>, wherein the detergent composition contains a solvent.

<122>

The detergent composition according to <121>, wherein the content of the solvent in the detergent composition is preferably 10 mass % or less, more preferably 4 mass % or less, further preferably 1 mass % or less, still further preferably 0.1 mass % or less.

<123>

Use of the precursor compound represented by a chemical formula (2) below, for producing the compound according to any one of <1> to <66>:

[Chemical Formula (2)]

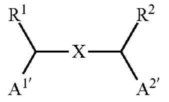

wherein $R^1$ and $R^2$ are each an aliphatic hydrocarbon group, X is a single bond or a hydrocarbon group having 1 or more and 5 or less carbon atoms, a total number of carbon atoms of $R^1$, $R^2$, and X is 2 or more and 39 or less, $A^{1'}$ is —OH, $A^{2'}$ is —O—$R^3$OH or —O-$A^{221}$OH, $R^3$ is an alkanediyl group having 4 or more and 18 or less carbon atoms, and $A^{221}$ is a linear alkane-α,ω-diyl group having 3 or more and 8 or less carbon atoms.

<124>

A method for producing the compound according to any one of <1> to <66>, including a process of adding an alkylene oxide having 2 or more and 3 or less carbon atoms to a precursor compound represented by the chemical formula (2) below:

[Chemical Formula (2)]

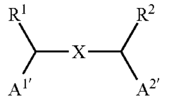

wherein $R^1$ and $R^2$ are each an aliphatic hydrocarbon group, X is a single bond or a hydrocarbon group having 1 or more and 5 or less carbon atoms, a total number of carbon atoms of $R^1$, $R^2$, and X is 2 or more and 39 or less, $A^{1'}$ is —OH, $A^{2'}$ is —O—$R^3$OH, and $R^3$ is an alkanediyl group having 4 or more and 18 or less carbon atoms.

<125>

A method for producing the compound according to any one of <1> to <66>, including a process of adding an alkylene oxide having 2 or more and 8 or less carbon atoms to a precursor compound represented by the chemical formula (2) below:

[Chemical Formula (2)]

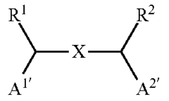

wherein $R^1$ and $R^2$ are each an aliphatic hydrocarbon group, X is a single bond or a hydrocarbon group having 1 or more and 5 or less carbon atoms, a total number of carbon atoms of $R^1$, $R^2$, and X is 2 or more and 39 or less, $A^{1'}$ is —OH, $A^{2'}$ is —O-$A^{221}$OH, and $A^{221}$ is a linear alkane-α,ω-diyl group having 3 or more and 8 or less carbon atoms.

EXAMPLES

Hereinafter, the present invention is specifically described on the basis of examples. The content (%) of the components in tables is represented in mass % unless otherwise described. The measurement methods are as follows.

<Method for Measuring Position of Double Bond in Internal Olefin>

The position of a double bond in a prepared internal olefin was measured by gas chromatography (hereinafter, abbreviated as GC). Specifically, the internal olefin was reacted with dimethyl sulfide into a dithionate derivative, and the components were then separated by GC. The position of a double bond in the internal olefin was obtained from the peak areas of the components. The apparatus used for the measurement and the analysis conditions are as follows. GC apparatus: trade name HP6890 (manufactured by Hewlett-Packard Company)

Column: trade name Ultra-Alloy-1HT capillary column 30 m×250 μm×0.15 μm (manufactured by Frontier Laboratories Ltd.)

Detector: hydrogen flame ion detector (FID)

Injection temperature: 300° C.

Detector temperature: 350° C.

Oven: 60° C. (0 min.)→2° C./min.→225° C.→20° C./min.→350° C.→350° C. (5.2 min.)

<Method for Measuring Position of Hydroxy Group in Internal Diol, and Method for Measuring Position of Hydroxy Group in Glycol Reactant>

To 20 mg of a reaction refined product was added 1 ml of TMS-I (manufactured by GL Sciences Inc.), and the mixture was stirred and left to stand still for 10 minutes. Then, 1 ml of hexane was added, and the mixture was filtered and then measured by GC. The measurement conditions are as follows.

GC apparatus: trade name HP6890N (manufactured by Hewlett-Packard Company)

Column: trade name Ultra-Alloy-1HT capillary column 30 m×250 μm×0.15 μm (manufactured by Frontier Laboratories Ltd.)

Detector: hydrogen flame ion detector (FID)

Injection temperature: 300° C.

Detector temperature: 350° C.

Oven: 100° C. (0 min.)→12° C./min.→350° C.→350° C. (5.2 min.)

Production of Internal Olefin

Production Example A1

(Production of Internal Olefin (C16 Internal Olefin) Having 16 Carbon Atoms)

Into a flask equipped with a stirrer were charged 7000 g (28.9 mol) of 1-hexadecanol (product name: KALCOL 6098, manufactured by Kao Corporation) and 700 g (10 wt % relative to raw material alcohol) of γ-alumina (STREM Chemicals, Inc.) as a solid acid catalyst, and the mixture was reacted under stirring at 280° C. for 32 hours with a flow of nitrogen (7000 mL/min) through the system. After the completion of the reaction, the alcohol conversion rate was 100% and the C16 olefin purity was 99.6%. The obtained crude C16 internal olefin was transferred to a distiller, and was distilled at 136 to 160° C./4.0 mmHg to give a C16 internal olefin having an olefin purity of 100%. The double bond distribution in the C16 obtained internal olefin was 0.2% at the C1 position, 15.8% at the C2 position, 14.5% at the C3 position, 15.7% at the C4 position, 17.3% at the C5 position, 16.5% at the C6 position, and 20.0% at the C7 position and the C8 position in total.

Production Example A1'

(Production of Internal Olefin Having 16 Carbon Atoms (C16 Internal Olefin))

Into a reactor equipped with a stirrer were charged 800 kg (3.3 kmol) of 1-hexadecanol (product name: KALCOL 6098, manufactured by Kao Corporation) and 40 kg (5 wt % relative to raw material alcohol) of activated alumina GP-20 (Mizusawa Industrial Chemicals, Ltd.) as a solid acid catalyst, and the mixture was reacted under stirring at 280° C. for 32 hours with a flow of nitrogen (15 L/min) through the system. After the completion of the reaction, the alcohol conversion rate was 100% and the C16 olefin purity was 98.5%. The obtained crude C16 internal olefin was transferred to a distiller, and was distilled at 135 to 159° C./5.3 mmHg to give a C16 internal olefin having an olefin purity of 100%. The double bond distribution in the obtained C16 internal olefin was 0.2% at the C1 position, 15.8% at the C2 position, 14.5% at the C3 position, 15.7% at the C4 position, 17.3% at the C5 position, 16.5% at the C6 position, and 20.0% at the C7 position and the C8 position in total.

Production Example A2

(Production of Internal Olefin (C18 Internal Olefin) Having 18 Carbon Atoms)

Into a reactor equipped with a stirrer were charged 800 kg (3.0 kmol) of 1-octadecanol (product name: KALCOL 8098, manufactured by Kao Corporation) and 80 kg (10 wt % relative to raw material alcohol) of activated alumina GP-20 (Mizusawa Industrial Chemicals, Ltd.) as a solid acid catalyst, and the mixture was reacted under stirring at 280° C. for 16 hours with a flow of nitrogen (15 L/min) through the system. After the completion of the reaction, the alcohol conversion rate was 100% and the C18 olefin purity was 98.7%. The obtained crude C18 internal olefin was transferred to a distiller, and was distilled at 163 to 190° C./4.6 mmHg to give a C18 internal olefin having an olefin purity of 100%. The double bond distribution in the obtained C18 internal olefin was 0.3% at the C1 position, 13.3% at the C2 position, 12.6% at the C3 position, 13.9% at the C4 position, 14.8% at the C5 position, 13.7% at the C6 position, 12.6 at the C7 position, and 18.8% at the C8 position and the C9 position in total.

<Production of Internal Epoxide>

Production Example B1

(Production of Internal Epoxide (C16 Internal Epoxide) Having 16 Carbon Atoms)

Into a flask equipped with a stirrer were charged 800 g (3.56 mol) of the C16 internal olefin obtained in Production Example A1 or Production Example A1', 107 g (1.78 mol) of acetic acid (manufactured by Wako Pure Chemical Industries, Ltd.), 15.6 g (0.15 mol) of sulfuric acid (manufactured by Wako Pure Chemical Industries, Ltd.), 415.7 g (4.28 mol) of 35% hydrogen peroxide (manufactured by Wako Pure Chemical Industries, Ltd.), and 25.3 g (0.18 mol) of sodium sulfate (manufactured by Wako Pure Chemical Industries, Ltd.), and the mixture was reacted at 50° C. for 4 hours. Thereafter, the mixture was heated to 70° C. and further reacted for 2 hours. After the reaction, the mixture was separated into layers, an aqueous layer was removed, and an oil layer was washed with ion-exchanged water, a saturated aqueous sodium carbonate solution (manufactured by Wako Pure Chemical Industries, Ltd.), a saturated aqueous sodium sulfite solution (manufactured by Wako Pure Chemical Industries, Ltd.), and 1% saline (manufactured by Wako Pure Chemical Industries, Ltd.), and concentrated in an evaporator to give 820 g of a C16 internal epoxide.

Production Example B2

(Production of Internal Epoxide (C18 Internal Epoxide) Having 18 Carbon Atoms)

Into a flask equipped with a stirrer were charged 595 g (2.38 mol) of the C18 internal olefin obtained in Production Example A2, 71.7 g (1.20 mol) of acetic acid (manufactured by Wako Pure Chemical Industries, Ltd.), 9.8 g (0.10 mol) of sulfuric acid (manufactured by Wako Pure Chemical Industries, Ltd.), and 324 g (4.00 mol) of 35% hydrogen peroxide (manufactured by Wako Pure Chemical Industries, Ltd.), and the mixture was reacted at 50° C. for 4 hours. Thereafter, the mixture was heated to 80° C. and further reacted for 5 hours. After the reaction, the mixture was separated into layers, an aqueous layer was removed, and an oil layer was washed with ion-exchanged water, a saturated aqueous sodium carbonate solution (manufactured by Wako Pure Chemical Industries, Ltd.), a saturated aqueous sodium sulfite solution (manufactured by Wako Pure Chemical Industries, Ltd.), and ion-exchanged water, and concentrated in an evaporator to give 629 g of a C18 internal epoxide.

Production of Reactant of Internal Epoxide and Glycol

Production Example C1

(Production of Reactant of C16 Internal Epoxide and 1,2-Butanediol (C16-1,2-Butanediol Condensation Product))

Into a flask equipped with a stirrer were charged 450 g (4.99 mol) of 1,2-butanediol (manufactured by Wako Pure Chemical Industries, Ltd.) and 0.05 g (0.50 mmol) of 98% sulfuric acid (manufactured by Wako Pure Chemical Industries, Ltd.), and the mixture was heated to 110° C. Thereafter, 120 g (0.50 mol) of the C16 internal epoxide obtained in Production Example B1 were added dropwise over 1 hour, and then the mixture was reacted at 110° C./30 minutes. Hexane was added to the liquid obtained by this reaction, and the mixture was washed with ion-exchanged water and then concentrated under reduced pressure in an evaporator to give 154 g of a C16-1,2-butanediol condensation product. The diol positional distribution (positional distribution of carbon atoms having —OH and —$OCH_2CH(C_2H_5)OH$) in the obtained C16-1,2-butanediol condensation product was 0.4% at the C1,2 position, 14.9% at the C2,3 position, 14.8% at the C3,4 position, 16.4% at the C4,5 position, and 53.5% at the C5,6 position, the C6,7 position, the C7,8 position, and the C8,9 position in total.

Production Example C2

(Production of Reactant of C16 Internal Epoxide and 1,3-Butanediol (C16-1,3-Butanediol Condensation Product))

A C16-1,3-butanediol condensation product (152 g) was obtained by the same method as in Production Example C1 except that 1,3-butanediol (manufactured by Wako Pure Chemical Industries, Ltd.) was used in place of 1,2-butanediol (manufactured by Wako Pure Chemical Industries, Ltd.). The diol positional distribution (positional distribution of carbon atoms having —OH and —$O(CH_2)_2CH(CH_3)OH$) in the obtained C16-1,3-butanediol condensation product was 0.7% at the C1,2 position, 15.7% at the C2,3 position, 14.4% at the C3,4 position, 18.3% at the C4,5 position, and 50.9% at the C5,6 position, the C6,7 position, the C7,8 position, and the C8,9 position in total.

Production Example C3

(Production of Reactant of C16 Internal Epoxide and 1,4-Butanediol (C16-1,4-Butanediol Condensation Product))

Into a flask equipped with a stirrer were charged 1784 g (19.80 mol) of 1,4-butanediol (manufactured by Wako Pure Chemical Industries, Ltd.) and 0.02 g (1.80 mmol) of 98% sulfuric acid (manufactured by Wako Pure Chemical Industries, Ltd.), and the mixture was heated to 110° C. Thereafter, 450 g (1.87 mol) of the C16 internal epoxide obtained in Production Example B1 were added dropwise over 1 hour, and then the mixture was reacted at 110° C./30 minutes. Hexane was added to the liquid obtained by this reaction, and the mixture was washed with ion-exchanged water and then concentrated under reduced pressure in an evaporator to give 592 g of a C16-1,4-butanediol condensation product. The diol positional distribution (positional distribution of carbon atoms having —OH and —$O(CH_2)_4OH$) in the obtained C16-1,4-butanediol condensation product was 0.4% at the C1,2 position, 14.5% at the C2,3 position, 14.5% at the C3,4 position, 17.4% at the C4,5 position, and 53.2% at the C5,6 position, the C6,7 position, the C7,8 position, and the C8,9 position in total.

Production Example C4

(Production of Reactant of C16 Internal Epoxide and 1,6-Hexanediol (C16-1,6-Hexanediol Condensation Product))

Into a flask equipped with a stirrer were charged 490 g (4.15 mol) of 1,6-hexanediol (manufactured by Wako Pure Chemical Industries, Ltd.) and 0.04 g (0.42 mmol) of 98% sulfuric acid (manufactured by Wako Pure Chemical Industries, Ltd.), and the mixture was heated to 110° C. Thereafter, 105 g (0.44 mol) of the C16 internal epoxide obtained in Production Example B1 were added dropwise over 30 minutes, and then the mixture was reacted at 110° C./1 hour. Hexane was added to the liquid obtained by this reaction, and the mixture was washed with ion-exchanged water and then concentrated under reduced pressure in an evaporator to give 144 g of a C16-1,6-hexanediol condensation product. The diol positional distribution (positional distribution of carbon atoms having —OH and —$O(CH_2)_6OH$) in the obtained C16-1,6-hexanediol condensation product was 0.4% at the C1,2 position, 14.5% at the C2,3 position, 14.9% at the C3,4 position, 17.0% at the C4,5 position, and 53.2% at the C5,6 position, the C6,7 position, the C7,8 position, and the C8,9 position in total.

Production Example C5

(Production of Reactant of C18 Internal Epoxide and 1,4-Butanediol (C18-1,4-Butanediol Condensation Product))

1,4-Butanediol (manufactured by Wako Pure Chemical Industries, Ltd.) in an amount of 1155 g (12.8 mol) was charged into a flask equipped with a stirrer and heated to 110° C. Thereafter, 300 g (1.12 mol) of the C18 internal epoxide obtained in Production Example B2 were added dropwise over 1 hour, and then the mixture was reacted at 110° C./0.5 hours. Hexane was added to the liquid obtained by this reaction, and the mixture was washed with ion-exchanged water and then concentrated under reduced pressure in an evaporator to give 383 g of a C18-1,4-butanediol condensation product. The diol positional distribution (positional distribution of carbon atoms having —OH and —$O(CH_2)_4OH$) in the obtained C18-1,4-butanediol condensation product was 0.5% at the C1,2 position, 12.9% at the C2,3 position, 13.1% at the C3,4 position, 15.2% at the C4,5 position, 14.0% at the C5,6 position, and 44.3% at the C6,7 position, the C7,8 position, the C8,9 position, and the C9,10 in total.

Production Example C6

(Production of Reactant of C16 Internal Epoxide and Ethylene Glycol (C16-Ethylene Glycol Condensation Product))

Ethylene glycol (manufactured by Wako Pure Chemical Industries, Ltd.) in an amount of 4563 g (73.52 mol) was charged into a flask equipped with a stirrer and heated to 110° C. Thereafter, 1100 g (4.58 mol) of the C16 internal epoxide obtained in Production Example B1 were added dropwise over 1 hour, and then the mixture was reacted at 110° C./0.5 hours. Hexane was added to the liquid obtained by this reaction, and the mixture was washed with ion-exchanged water and then concentrated under reduced pressure in an evaporator to give 1312 g of a C16-ethylene glycol condensation product. The diol positional distribution (positional distribution of carbon atoms having —OH and $O(CH_2)_2OH$) in the obtained C16-ethylene glycol condensation product was 0.5% at the C1,2 position, 15.1% at the C2,3 position, 14.9% at the C3,4 position, 17.1% at the C4,5 position, 16.0% at the C5,6 position, and 36.4% at the C6,7 position, the C7,8 position, and the C8,9 position in total.

Production Example C7

(Production of Reactant of C16 Internal Epoxide and 1,3-Propanediol (C16-1,3-Propanediol Condensation Product))

Into a flask equipped with a stirrer were charged 1094 g (14.38 mol) of 1,3-propanediol (manufactured by Wako Pure Chemical Industries, Ltd.), 0.18 g (1.80 mmol) of 98% sulfuric acid (manufactured by Wako Pure Chemical Industries, Ltd.), and 450 g (1.87 mol) of the C16 internal epoxide obtained in Production Example B1, and the mixture was reacted at 110° C./1 hour. Hexane was added to the liquid obtained by this reaction, and the mixture was washed with ion-exchanged water and then concentrated under reduced pressure in an evaporator to give 573 g of a C16-1,3-propanediol condensation product. The diol positional distribution (positional distribution of carbon atoms having —OH and —$O(CH_2)_3OH$) in the obtained C16-1,3-propanediol condensation product was 0.5% at the C1,2 position, 15.3% at the C2,3 position, 14.5% at the C3,4 position, 16.8% at the C4,5 position, and 52.9% at the C5,6 position, the C6,7 position, the C7,8 position, and the C8,9 position in total.

Production Example C8

(Production of Reactant of C16 Internal Epoxide and 1,4-Butanediol (C16-1,4-Butanediol Condensation Product))

Into a flask equipped with a stirrer were charged 1784 g (19.80 mol) of 1,4-butanediol (manufactured by Wako Pure Chemical Industries, Ltd.) and 0.02 g (1.80 mmol) of 98% sulfuric acid (manufactured by Wako Pure Chemical Industries, Ltd.), and the mixture was heated to 110° C. Thereafter, 450 g (1.87 mol) of the C16 internal epoxide obtained in Production Example B1 were added dropwise over 1 hour, and then the mixture was reacted at 110° C./30 minutes. Hexane was added to the liquid obtained by this reaction, and the mixture was washed with ion-exchanged water and then concentrated under reduced pressure in an evaporator to give 592 g of a C16-1,4-butanediol condensation product. The diol positional distribution (positional distribution of carbon atoms having —OH and —$O(CH_2)_4OH$) in the obtained C16-1,4-butanediol condensation product was 0.4% at the C1,2 position, 14.5% at the C2,3 position, 14.5% at the C3,4 position, 17.4% at the C4,5 position, and 53.2% at the C5,6 position, the C6,7 position, the C7,8 position, and the C8,9 position in total.

Production Example C9

(Production of Reactant of C16 Internal Epoxide and 1,6-Hexanediol (C16-1,6-Hexanediol Condensation Product))

Into a flask equipped with a stirrer were charged 490 g (4.15 mol) of 1,6-hexanediol (manufactured by Wako Pure Chemical Industries, Ltd.) and 0.04 g (0.42 mmol) of 98% sulfuric acid (manufactured by Wako Pure Chemical Industries, Ltd.), and the mixture was heated to 110° C. Thereafter, 105 g (0.44 mol) of the C16 internal epoxide obtained in Production Example B1 were added dropwise over 30 minutes, and then the mixture was reacted at 110° C./1 hour. Hexane was added to the liquid obtained by this reaction, and the mixture was washed with ion-exchanged water and then concentrated under reduced pressure in an evaporator to give 144 g of a C16-1,6-hexanediol condensation product. The diol positional distribution (positional distribution of carbon atoms having —OH and —$O(CH_2)_6OH$) in the obtained C16-1,6-hexanediol condensation product was 0.4% at the C1,2 position, 14.5% at the C2,3 position, 14.9% at the C3,4 position, 17.0% at the C4,5 position, and 53.2% at the C5,6 position, the C6,7 position, the C7,8 position, and the C8,9 position in total.

Production Example C10

(Production of Reactant of C18 Internal Epoxide and 1,3-Propanediol (C18-1,3-Propanediol Condensation Product))

Into a flask equipped with a stirrer were charged 1499 g (19.69 mol) of 1,3-propanediol (manufactured by Wako Pure Chemical Industries, Ltd.), 0.20 g (1.97 mmol) of 98% sulfuric acid (manufactured by Wako Pure Chemical Industries, Ltd.), and 550 g (2.05 mol) of the C18 internal epoxide obtained in Production Example B2, and the mixture was reacted at 110° C./1 hour. Hexane was added to the liquid obtained by this reaction, and the mixture was washed with ion-exchanged water and then concentrated under reduced pressure in an evaporator to give 691 g of a C18-1,3-propanediol condensation product. The diol positional distribution (positional distribution of carbon atoms having —OH and —$O(CH_2)_3OH$) in the obtained C18-1,3-propanediol condensation product was 0.5% at the C1,2 position, 13.3% at the C2,3 position, 13.3% at the C3,4 position, 14.9% at the C4,5 position, 14.0% at the C5,6 position, and 44.0% at the C6,7 position, the C7,8 position, the C8,9 position, and the C9,10 in total.

Production Example C11

(Production of Reactant of C18 Internal Epoxide and 1,4-Butanediol (C18-1,4-Butanediol Condensation Product))

1,4-Butanediol (manufactured by Wako Pure Chemical Industries, Ltd.) in an amount of 1155 g (12.8 mol) was charged into a flask equipped with a stirrer and heated to 110° C. Then, 300 g (1.07 mol) of the C18 internal epoxide obtained in Production Example B2 were added dropwise over 1 hour. Thereafter, the mixture was reacted at 110° C./0.5 hours. Hexane was added to the liquid obtained by this reaction, and the mixture was washed with ion-exchanged water and then concentrated under reduced pressure in an evaporator to give 383 g of a C18-1,4-butanediol condensation product. The diol positional distribution (positional distribution of carbon atoms having —OH and —$O(CH_2)_4OH$) in the obtained C18-1,4-butanediol condensation product was 0.5% at the C1,2 position, 12.9% at the C2,3 position, 13.1% at the C3,4 position, 15.2% at the C4,5 position, 14.0% at the C5,6 position, and 44.3% at the C6,7 position, the C7,8 position, the C8,9 position, and the C9,10 in total.

Production Example C12

(Production of Reactant of C16 Internal Epoxide and Ethylene Glycol (C16-Ethylene Glycol Condensation Product))

Ethylene glycol (manufactured by Wako Pure Chemical Industries, Ltd.) in an amount of 4563 g (73.52 mol) was charged into a flask equipped with a stirrer and heated to 110° C. Thereafter, 1100 g (4.58 mol) of the C16 internal epoxide obtained in Production Example B1 were added dropwise over 1 hour, and then the mixture was reacted at 110° C./0.5 hours. Hexane was added to the liquid obtained by this reaction, and the mixture was washed with ion-exchanged water and then concentrated under reduced pressure in an evaporator to give 1312 g of a C16-ethylene glycol condensation product. The diol positional distribution (positional distribution of carbon atoms having —OH and $O(CH_2)_2OH$) in the obtained C16-ethylene glycol condensation product was 0.5% at the C1,2 position, 15.1% at the C2,3 position, 14.9% at the C3,4 position, 17.1% at the C4,5 position, 16.0% at the C5,6 position, and 36.4% at the C6,7 position, the C7,8 position, and the C8,9 position in total.

Production of Internal Two Hydrophilic Groups-Containing Compound

Example 1

(Production of EO (14 Mol) Adduct of C16-1,2-Butanediol Condensation Product (C16-1,2BD-EO14))

Into a 2-L autoclave equipped with a stirrer, a thermometer, and an AO inlet tube were charged 200 g (0.605 mol, raw material) of the C16-1,2-butanediol condensation product obtained in Production Example C1 and 0.789 g (0.0121 mol) of 86% KOH, and after nitrogen substitution was performed, the mixture was subjected to dehydration at 110° C. and −0.101 MPa for 1 hour. Thereafter, 373 g (8.47 mol) of EO were fed to the mixture and thus added at an initial nitrogen pressure of 0.005 MPa and 155±5° C. Thereafter, 0.741 g (0.0123 mol) of acetic acid were added and the mixture was thereby neutralized to give C16-1,2BD-E014).

The average number of added moles of EO in the obtained product was confirmed by 1H-NMR.

Examples 2 to 5, 8, and 9, and Comparative Examples 1 to 3

The products shown in Tables 1 and 2 were obtained in the same manner as in Example 1 unless otherwise described, except that the raw material, the type of AO, KOH, and acetic acid shown in Table 1 were used in the usage amounts shown in Table 1. The compounds shown in Tables 1 and 2 are as follows. AO shown in Table 1 represents alkylene oxide, EO represents ethylene oxide, and PO represents propylene oxide. AO shown in Table 2 represents alkyleneoxy group, EO represents ethyleneoxy group, PO represents propyleneoxy group, branched BO represents branched butyleneoxy group, linear BO represents linear butyleneoxy group, and linear HO represents linear hexyleneoxy group.

C16-1,3BD-EO14: EO (14 mol) adduct of C16-1,3-butanediol condensation product

C16-1,4BD-EO9: EO (9 mol) adduct of C16-1,4-butanediol condensation product

C16-1,4BD-EO14: EO (14 mol) adduct of C16-1,4-butanediol condensation product

C16-1,4BD-EO19: EO (19 mol) adduct of C16-1,4-butanediol condensation product

C16-1,6HD-EO14: EO (14 mol) adduct of C16-1,6-hexanediol condensation product

C18-1,4BD-EO14: EO (14 mol) adduct of C18-1,4-butanediol condensation product

C16-EG-EO9: EO (9 mol) adduct of C16-ethylene glycol condensation product

C16-EG-E014: EO (14 mol) adduct of C16-ethylene glycol condensation product

C16-EG-E019: EO (19 mol) adduct of C16-ethylene glycol condensation product

Example 6

(Production of EO (6 Mol)-PO (2 Mol)-EO (6 Mol) Block Adduct of C16-1,4-Butanediol Condensation Product (C16-1,4BD-EO6-PO2-EO6))

Into a 2-L autoclave equipped with a stirrer, a thermometer, and an AO inlet tube were charged 200 g (0.605 mol) of the C16-1,4-butanediol condensation product obtained in Production Example C3 and 0.789 g (0.0121 mol) of 86% KOH, and after nitrogen substitution was performed, the mixture was subjected to dehydration at 110° C. and −0.101 MPa for 1 hour. Thereafter, 160 g (3.63 mol) of EO were fed to the mixture and thus added at an initial nitrogen pressure of 0.005 MPa and 155±5° C.

Subsequently, 70 g (1.21 mol) of PO were fed to the mixture and thus added at 125° C.±5° C. and then 160 g (3.63 mol) of EO were fed and thus added at 155±5° C. Thereafter, 0.741 g (0.0123 mol) of acetic acid were added and the mixture was thereby neutralized to give C16-1,4BD-EO6-PO2-EO6. The average numbers of added moles of EO and PO in the obtained product were confirmed by 1H-NMR.

Example 7

(Production of EO (8 Mol)-PO (2 Mol)-EO (9 Mol) Block Adduct of C16-1,4-Butanediol Condensation Product (C16-1,4BD-EO8-PO2-EO9))

Into a 2-L autoclave equipped with a stirrer, a thermometer, and an AO inlet tube were charged 200 g (0.605 mol) of the C16-1,4-butanediol condensation product obtained in Production Example C3 and 0.789 g (0.0121 mol) of 86% KOH, and after nitrogen substitution was performed, the mixture was subjected to dehydration at 110° C. and −0.101 MPa for 1 hour. Thereafter, 213 g (4.84 mol) of EO were fed to the mixture and thus added at an initial nitrogen pressure of 0.005 MPa and 155±5° C.

Subsequently, 70 g (1.21 mol) of PO were fed to the mixture and thus added at 125° C.±5° C. and then 240 g (5.45 mol) of EO were fed and thus added at 155±5° C. Thereafter, 0.741 g (0.0123 mol) of acetic acid were added and the mixture was thereby neutralized to give C16-1,4BD-EO8-PO2-EO9. The average numbers of added moles of EO and PO in the obtained product were confirmed by 1H-NMR.

Example 10

(Production of EO (9 Mol) Adduct of C16-1,3-Propanediol Condensation Product (C16-1,3PD-EO9))

Into a 2-L autoclave equipped with a stirrer, a thermometer, and an AO inlet tube were charged 200 g (0.632 mol, raw material) of the C16-1,3-propanediol condensation product obtained in Production Example C7 and 0.824 g (0.0126 mol) of 86% KOH, and after nitrogen substitution was performed, the mixture was subjected to dehydration at 110° C. and −0.101 MPa for 1 hour. Thereafter, 250 g (5.69 mol) of EO were fed to the mixture and thus added at an initial nitrogen pressure of 0.005 MPa and 155±5° C. Thereafter, 0.774 g (0.0129 mol) of acetic acid were added and the mixture was thereby neutralized to give C16-1,3PD-EO9. The average number of added moles of EO in the obtained product was confirmed by 1H-NMR.

Examples 11, 12, and 15 to 18, and Comparative Examples 4 to 6

The products shown in Tables 4 and 5 were obtained in the same manner as in Example 10 unless otherwise described, except that the raw material, the type of AO, KOH, and acetic acid shown in Table 4 were used in the usage amounts shown in Table 4. The compounds shown in Tables 4 and 5 are as follows. AO shown in Table 4 represents alkylene oxide, EO represents ethylene oxide, and PO represents propylene oxide. AO shown in Table 5 represents alkyleneoxy group, EO represents ethyleneoxy group, PO represents propyleneoxy group, linear PO represents linear propyleneoxy group, linear BO represents linear butyleneoxy group, and linear HO represents linear hexyleneoxy group.

C16-1,3PD-EO14: EO (14 mol) adduct of C16-1,3-propanediol condensation product

C16-1,3PD-EO19: EO (19 mol) adduct of C16-1,3-propanediol condensation product

C16-1,4BD-EO14: EO (14 mol) adduct of C16-1,4-butanediol condensation product

C16-1,6HD-EO14: EO (14 mol) adduct of C16-1,6-hexanediol condensation product

C18-1,3PD-EO14: EO (14 mol) adduct of C18-1,3-propanediol condensation product

C18-1,4BD-EO14: EO (14 mol) adduct of C18-1,4-butanediol condensation product

C16-EG-EO9: EO (9 mol) adduct of C16-ethylene glycol condensation product

C16-EG-E014: EO (14 mol) adduct of C16-ethylene glycol condensation product

C16-EG-E019: EO (19 mol) adduct of C16-ethylene glycol condensation product

Example 13

(Production of EO (12 Mol)-PO (2 Mol) Block Adduct of C16-1,3-Propanediol Condensation Product (C16-1,3PD-EO12-PO2))

Into a 2-L autoclave equipped with a stirrer, a thermometer, and an AO inlet tube were charged 200 g (0.632 mol) of the C16-1,3-propanediol condensation product obtained in Production Example C7 and 0.824 g (0.0126 mol) of 86% KOH, and after nitrogen substitution was performed, the mixture was subjected to dehydration at 110° C. and −0.101 MPa for 1 hour. Thereafter, 334 g (7.58 mol) of EO were fed to the mixture and thus added at an initial nitrogen pressure of 0.005 MPa and 155±5° C.

Subsequently, 73 g (1.26 mol) of PO were fed to the mixture and thus added at 125° C.±5° C. Thereafter, 0.774 g (0.0129 mol) of acetic acid were added and the mixture was thereby neutralized to give C16-1,3PD-EO12-PO2. The average numbers of added moles of EO and PO in the obtained product were confirmed by 1H-NMR.

Example 14

(Production of EO (6 Mol)-PO (2 Mol)-EO (6 Mol) Block Adduct of C16-1,3-Propanediol Condensation Product (C16-1,3PD-EO6-PO2-EO6))

Into a 2-L autoclave equipped with a stirrer, a thermometer, and an AO inlet tube were charged 200 g (0.632 mol) of the C16-1,3-propanediol condensation product obtained in Production Example C7 and 0.824 g (0.0126 mol) of 86% KOH, and after nitrogen substitution was performed, the mixture was subjected to dehydration at 110° C. and −0.101 MPa for 1 hour. Thereafter, 167 g (3.79 mol) of EO were fed to the mixture and thus added at an initial nitrogen pressure of 0.005 MPa and 155±5° C.

Subsequently, 73 g (1.26 mol) of PO were fed to the mixture and thus added at 125° C.±5° C. and then 167 g (3.79 mol) of EO were fed and thus added at 155±5° C. Thereafter, 0.774 g (0.0129 mol) of acetic acid were added and the mixture was thereby neutralized to give C16-1,3PD-EO6-PO2-EO6. The average numbers of added moles of EO and PO in the obtained product were confirmed by 1H-NMR.

The internal two hydrophilic groups-containing compounds produced in the examples and the comparative examples were evaluated as follows.

<Evaluation of Low-Temperature Stability/Flowability>

The internal two hydrophilic groups-containing compound produced in each of the examples and the comparative examples was taken into a beaker, ion-exchanged water was added to give a 40 or 50 mass % solution, and the solution was heated to uniformly dissolve the compound. A detergent composition was thus obtained. Thereafter, the detergent composition was cooled to 5° C., left for 1 day, then heated to the temperature shown in Table 3 or 6, and left to stand still for 3 days. Thereafter, the phase state of the detergent composition was observed. The phase state was determined as follows according to the presence or absence of flowability and the presence or absence of optical anisotropy determined by observation with a polarizer.

Appearance Flowability Optical anisotropy

Determination of Phase State

| | Not observed | | |
|---|---|---|---|
| White solid No | Not observed | | Solid (S) |
| Uniform and transparent solution crystal (H) | No | Yes | Liquid |

-continued

| | Not observed | | |
|---|---|---|---|
| White solid No | Not observed | | Solid (S) |
| Uniform and transparent solution crystal (I) | No | No | Liquid |
| Uniform and transparent solution | Yes | No | Uniform |

aqueous solution (Wm)

Further, after the determination of the phase state, the detergent composition in a micelle state was evaluated as ○ (passed) and the detergent in a liquid crystal or solid state as x (not passed) in terms of low-temperature stability/flowability.

<Evaluation of Low-Concentration Detergency>

[Preparation of Model-Sebum Artificially Soiled Fabric]

Model-sebum artificially soiled fabric was prepared by applying a model-sebum artificially soiling liquid having the following composition to fabric (cotton 2003 (manufactured by Senshoku shizai K.K. Tanigashira shouten)). The application of the model-sebum artificially soiling liquid to the fabric was carried out by performing gravure-roll-coater printing on the fabric with the artificially soiling liquid. The step of applying the model-sebum artificially soiling liquid to the fabric and thus preparing the model-sebum artificially soiled fabric was performed at a gravure-roll cell volume of 58 $cm^3/m^2$, an application rate of 1.0 m/min, a drying temperature of 100° C., and a drying time of 1 min. Thereafter, the fabric was cut into a size of 6 cm×6 cm.

The composition of the model-sebum artificially soiling liquid: 0.4 mass % of lauric acid, 3.1 mass % of myristic acid, 2.3 mass % of pentadecanoic acid, 6.2 mass % of palmitic acid, 0.4 mass % of heptadecanoic acid, 1.6 mass % of stearic acid, 7.8 mass % of oleic acid, 13.0 mass % of triolein, 2.2 mass % of n-hexadecyl palmitate, 6.5 mass % of squalene, 1.9 mass % of egg-white lecithin liquid crystal, 8.1 mass % of Kanuma red soil, 0.01 mass % of carbon black, and the balance water (total 100 mass %)

[Washing Test]

The washing operation was performed using a tergotometer (manufactured by Ueshima Seisakusho Co., Ltd.). Washing water was obtained by charging calcium chloride and magnesium chloride at a mass ratio of 8:2 into ion-exchanged water and adjusting the hardness of the mixture to 4° dH (see JP-A-2017-214570 for the method for measuring German hardness). A washing liquid was obtained by mixing the internal two hydrophilic groups-containing compound prepared in each example or each comparative example with the washing water so that the concentration of the washing liquid was 30, 50, or 100 ppm. Into a 1-L washing test stainless-steel beaker were charged 0.6 L of the washing liquid and 5 pieces of the model-sebum artificially soiled fabric. The temperature of the washing liquid was 20° C. The model-sebum artificially soiled fabric was washed by the tergotometer at 85 rpm for 10 minutes. After the washing, the fabric was dehydrated and dried for 24 hours in an environment of 23° C. and 45% RH.

The detergency rate (%) of the model-sebum artificially soiled fabric was measured by the following method, and the average value of the 5 pieces of the fabric was obtained. Table 3 or 6 shows the results. The reflectance at 550 nm of unsoiled original fabric and the soiled fabric before and after washing was measured by a chronometer (manufactured by NIPPON DENSHOKU INDUSTRIES CO., LTD., Z-300A), and the detergency rate (%) was obtained by the following equation.

$$\text{Detergency rate (\%)}=100\times[(\text{reflectance after washing}-\text{reflectance before washing})/(\text{reflectance of original fabric}-\text{reflectance before washing})]$$

TABLE 1

| | Abbreviation of product | Raw material: Production Example | Raw material: Abbreviation | Usage amount of raw material [g] | Usage amount of raw material [mol] | Type of AO | Usage amount of AO [g] | Usage amount of AO [ mol] | Number of moles of AO relative to raw material | Usage amount of KOH [g] | Usage amount of KOH [mol] | Usage amount of acetic acid [g] | Usage amount of acetic acid [mol] |
|---|---|---|---|---|---|---|---|---|---|---|---|---|---|
| Example 1 | C16-1,2BD-EO14 | C1 | C16-1,2-butanediol condensation product | 200 | 0.605 | EO | 373 | 8.47 | 14 | 0.789 | 0.0121 | 0.741 | 0.0123 |
| Example 2 | C16-1,3BD-EO14 | C2 | C16-1,3-butanediol condensation product | 200 | 0.605 | EO | 373 | 8.47 | 14 | 0.789 | 0.0121 | 0.741 | 0.0123 |
| Example 3 | C16-1,4BD-EO9 | C3 | C16-1,4-butanediol condensation product | 200 | 0.605 | EO | 240 | 5.45 | 9 | 0.789 | 0.0121 | 0.741 | 0.0123 |
| Example 4 | C16-1,4BD-EO14 | | | 200 | 0.605 | EO | 373 | 8.47 | 14 | 0.789 | 0.0121 | 0.741 | 0.0123 |
| Example 5 | C16-1,4BD-EO19 | | | 200 | 0.605 | EO | 506 | 11.5 | 19 | 0.789 | 0.0121 | 0.741 | 0.0123 |
| Example 6 | C16-1,4BD-E06-PO2-EO6 | | | 200 | 0.605 | EO | 160 | 3.63 | 6 | 0.789 | 0.0121 | 0.741 | 0.0123 |
| | | | | | | PO | 70 | 1.21 | 2 | | | | |
| | | | | | | EO | 160 | 3.63 | 6 | | | | |
| Example 7 | C16-1,4BD-E08-PO2-EO9 | | | 200 | 0.605 | EO | 213 | 4.84 | 8 | 0.789 | 0.0121 | 0.741 | 0.0123 |
| | | | | | | PO | 70 | 1.21 | 2 | | | | |
| | | | | | | EO | 240 | 5.45 | 9 | | | | |
| Example 8 | C16-1,6HD-EO14 | C4 | C16-1,6-hexanediol condensation product | 200 | 0.558 | EO | 344 | 7.81 | 14 | 0.727 | 0.0112 | 0.683 | 0.0114 |
| Example 9 | C18-1,4BD-EO14 | C5 | C18-1,4-butanediol condensation product | 200 | 0.558 | EO | 344 | 7.81 | 14 | 0.727 | 0.0112 | 0.683 | 0.0114 |
| Comparative Example 1 | C16-EG-EO9 | C6 | C16-ethylene glycol condensation product | 200 | 0.661 | EO | 262 | 5.95 | 9 | 0.862 | 0.0132 | 0.810 | 0.0135 |
| Comparative Example 2 | C16-EG-EO14 | | | 200 | 0.661 | EO | 408 | 9.26 | 14 | 0.862 | 0.0132 | 0.810 | 0.0135 |
| Comparative Example 3 | C16-EG-EO19 | | | 200 | 0.661 | EO | 553 | 12.56 | 19 | 0.862 | 0.0132 | 0.810 | 0.0135 |

TABLE 2

| | Abbreviation of product | Details of chemical formula (1): Number of carbon atoms of each of $R^1$ and $R^2$ | Total number of carbon atoms of $R^1$, $R^2$, and X | X | R | $A^{11}$ and $A^{21}$ | AO ($A^{11}O$, $A^{23}O$): Number of EOs ( average) | AO ($A^{11}O$, $A^{23}O$): Number of POS ( average) | Total of m and n ( average value) |
|---|---|---|---|---|---|---|---|---|---|
| Example 1 | C16-1,2BD-EO14 | 1 to 13 | 14 | Single bond | 1,2-Butanediyl group | Ethanediyl group | 14 | — | 14 |
| Example 2 | C16-1,3BD-EO14 | 1 to 13 | 14 | Single bond | 1,3-Butanediyl group | Ethanediyl group | 14 | — | 14 |
| Example 3 | C16-1,4BD-EO9 | 1 to 13 | 14 | Single bond | 1,4-Butanediyl group | Ethanediyl group | 9 | — | 9 |
| Example 4 | C16-1,4BD-EO14 | 1 to 13 | 14 | Single bond | 1,4-Butanediyl group | Ethanediyl group | 14 | — | 14 |
| Example 5 | C16-1,4BD-EO19 | 1 to 13 | 14 | Single bond | 1,4-Butanediyl group | Ethanediyl group | 19 | — | 19 |
| Example 6 | C16-1,4BD-EO6-PO2-EO6 | 1 to 13 | 14 | Single bond | 1,4-Butanediyl group | Ethanediyl group or 1,2-propanediyl group | 12 | 2 | 14 |
| Example 7 | C16-1,4BD-EO8-PO2-EO9 | 1 to 13 | 14 | Single bond | 1,4-Butanediyl group | Ethanediyl group or 1,2-propanediyl group | 17 | 2 | 19 |
| Example 8 | C16-1,6HD-EO14 | 1 to 13 | 14 | Single bond | 1,6-Hexandiyl group | Ethanediyl group | 14 | — | 14 |
| Example 9 | C18-1,4BD-EO14 | 1 to 15 | 16 | Single bond | 1,4-Butanediyl group | Ethanediyl group | 14 | — | 14 |
| Comparative Example 1 | C16-EG-EO9 | 1 to 13 | 14 | Single bond | Ethanediyl group | Ethanediyl group | 9 | — | 9 |
| Comparative Example 2 | C16-EG-EO14 | 1 to 13 | 14 | Single bond | Ethanediyl group | Ethanediyl group | 14 | — | 14 |
| Comparative Example 3 | C16-EG-EO19 | 1 to 13 | 14 | Single bond | Ethanediyl group | Ethanediyl group | 19 | — | 19 |

TABLE 3

| | Compound | Low-temperature stability/flowability | Low-concentration (50 ppm) detergency rate (%) |
|---|---|---|---|
| Example 1 | C16-1,2BD-EO14 | 20° C. 40% Wm (○) | 20.1 |
| Example 2 | C16-1,3BD-EO14 | 20° C. 40% Wm (○) | 14.8 |
| Example 3 | C16-1,4BD-EO9 | 30° C. 50% Wm (○) | 23.8 |
| Example 4 | C16-1,4BD-EO14 | 20° C. 40% Wm (○) | 20.9 |
| Example 5 | C16-1,4BD-EO19 | 30° C. 50% Wm (○) | 19.5 |
| Example 6 | C16-1,4BD-EO6-PO2-EO6 | 20° C. 40% Wm (○) | 18.8 |
| Example 7 | C16-1,4BD-EO8-PO2-EO9 | 30° C. 50% Wm (○) | 17.2 |
| Example 8 | C16-1,6HD-EO14 | 20° C. 40% Wm (○) | 22.4 |
| Example 9 | C18-1,4BD-EO14 | 20° C. 40% Wm (○) | 25.8 |
| Comparative Example 1 | C16-EG-EO9 | 30° C. 50% H (X) | 22.5 |
| Comparative Example 2 | C16-EG-EO14 | 20° C. 40% I (X) | 13.5 |
| Comparative Example 3 | C16-EG-EO19 | 30° C. 50% Wm (○) | 9.3 |

TABLE 4

| | Abbreviation of product | Raw material: Production Example | Raw material: Abbreviation | Usage amount of raw material [g] | Usage amount of raw material [mol] | Type of AO | Usage amount of AO [g] | Usage amount of AO [mol] | Number of moles of AO relative to raw material | Usage amount of KOH [g] | Usage amount of KOH [mol] | Usage amount of acetic acid [g] | Usage amount of acetic acid [mol] |
|---|---|---|---|---|---|---|---|---|---|---|---|---|---|
| Example 10 | C16-1,3PD-EO9 | C7 | C16-1,3-propanediol | 200 | 0.632 | EO | 250 | 5.69 | 9 | 0.824 | 0.0126 | 0.774 | 0.0129 |
| Example 11 | C16-1,3PD-EO14 | | condensation product | 200 | 0.632 | EO | 390 | 8.85 | 14 | 0.824 | 0.0126 | 0.774 | 0.0129 |
| Example 12 | C16-1,3PD-EO19 | | | 200 | 0.632 | EO | 529 | 12.0 | 19 | 0.824 | 0.0126 | 0.774 | 0.0129 |
| Example 13 | C16-1,3PD-EO12-PO2 | | | 200 | 0.632 | EO<br>PO | 334<br>73 | 7.58<br>1.26 | 12<br>2 | 0.824 | 0.0126 | 0.774 | 0.0129 |
| Example 14 | C16-1,3PD-EO6-PO2-EO6 | | | 200 | 0.632 | EO<br>PO<br>EO | 167<br>73<br>167 | 3.79<br>1.26<br>3.79 | 6<br>2<br>6 | 0.824 | 0.0126 | 0.774 | 0.0129 |
| Example 15 | C16-1,4BD-EO14 | C8 | C16-1,4-butanediol condensation product | 200 | 0.605 | EO | 373 | 8.47 | 14 | 0.789 | 0.0121 | 0.741 | 0.0123 |
| Example 16 | C16-1,6HD-EO14 | C9 | C16-1,6-hexanediol condensation product | 200 | 0.558 | EO | 344 | 7.81 | 14 | 0.727 | 0.0112 | 0.683 | 0.0114 |
| Example 17 | C18-1,3PD-EO14 | C10 | C18-1,3-propanediol condensation product | 200 | 0.580 | EO | 358 | 5.95 | 14 | 0.756 | 0.0116 | 0.711 | 0.0118 |
| Example 18 | C18-1,4BD-EO14 | C11 | C18-1,4-butanediol condensation product | 200 | 0.558 | EO | 344 | 7.81 | 14 | 0.727 | 0.0112 | 0.683 | 0.0114 |
| Comparative Example 4 | C16-EG-EO9 | C12 | C16-ethylene glycol | 200 | 0.661 | EO | 262 | 9.26 | 9 | 0.82 | 0.013 | 0.810 | 0.0135 |
| Comparative Example 5 | C16-EG-EO14 | | condensation product | 200 | 0.661 | EO | 408 | 12.6 | 14 | 0.82 | 0.013 | 0.810 | 0.0135 |
| Comparative Example 6 | C16-EG-EO19 | | | 200 | 0.661 | EO | 553 | 7.81 | 19 | 0.82 | 0.013 | 0.810 | 0.0135 |

TABLE 5

| | Abbreviation of product | Details of chemical formula (1): Number of carbon atoms of each of $R^1$ and $R^2$ | Total number of carbon atoms of $R^1$, $R^2$, and X | X | Type of AO closest to main chain in $A^2$ ($A^{221}O$) | $A^{221}$ | AO ($A^{12}O$, $A^{22}O$): Number of EOS (average) | Number of POS (average) | Number of linear POS | Number of linear BOS | Number of linear HOS | Total of p and q (average value) |
|---|---|---|---|---|---|---|---|---|---|---|---|---|
| Example 10 | C16-1,3PD-EO9 | 1 to 13 | 14 | Single bond | Linear PO | 1,3-Propanediyl group | 9 | — | 1 | — | — | 10 |
| Example 11 | C16-1,3PD-EO14 | 1 to 13 | 14 | Single bond | Linear PO | 1,3-Propanediyl group | 14 | — | 1 | — | — | 15 |
| Example 12 | C16-1,3PD-EO19 | 1 to 13 | 14 | Single bond | Linear PO | 1,3-Propanediyl group | 19 | — | 1 | — | — | 20 |

TABLE 5-continued

| | Abbreviation of product | Details of chemical formula (1): Number of carbon atoms of each of $R^1$ and $R^2$ | Total number of carbon atoms of $R^1$, $R^2$, and X | X | Type of AO closest to main chain in $A^2$ ($A^{221}O$) | $A^{221}$ | AO ($A^{12}O$, $A^{22}O$): Number of EOS (average) | Number of POS (average) | Number of linear POS | Number of linear BOS | Number of linear HOS | Total of p and q (average value) |
|---|---|---|---|---|---|---|---|---|---|---|---|---|
| Example 13 | C16-1,3PD-EO12-PO2 | 1 to 13 | 14 | Single bond | Linear PO | 1,3-Propanediyl group | 12 | 2 | 1 | — | — | 15 |
| Example 14 | C16-1,3PD-EO6-PO2-EO6 | 1 to 13 | 14 | Single bond | Linear PO | 1,3-Propanediyl group | 12 | 2 | 1 | — | — | 15 |
| Example 15 | C16-1,4BD-EO14 | 1 to 13 | 14 | Single bond | Linear BO | 1,4-Butanediyl group | 14 | — | — | 1 | — | 15 |
| Example 16 | C16-1,6HD-EO14 | 1 to 13 | 14 | Single bond | Linear HO | 1,6-Hexandiyl group | 14 | — | — | — | 1 | 15 |
| Example 17 | C18-1,3PD-EO14 | 1 to 15 | 16 | Single bond | Linear PO | 1,3-Propanediyl group | 14 | — | 1 | — | — | 15 |
| Example 18 | C18-1,4BD-EO14 | 1 to 15 | 16 | Single bond | Linear BO | 1,4-Butanediyl group | 14 | — | — | 1 | — | 15 |
| Comparative Example 4 | C16-EG-EO9 | 1 to 13 | 14 | Single bond | EO | Ethanediyl group | 10 | — | — | — | — | 10 |
| Comparative Example 5 | C16-EG-EO14 | 1 to 13 | 14 | Single bond | EO | Ethanediyl group | 15 | — | — | — | — | 15 |
| Comparative Example 6 | C16-EG-EO19 | 1 to 13 | 14 | Single bond | EO | Ethanediyl group | 20 | — | — | — | — | 20 |

TABLE 6

| | Compound | Low-temperature stability/flowability | Low-concentration detergency rate (%): 30 ppm | 50 ppm | 100 ppm |
|---|---|---|---|---|---|
| Example 10 | C16-1,3PD-EO9 | 30° C. 50% Wm (○) | 16.1 | — | — |
| Example 11 | C16-1,3PD-EO14 | 30° C. 40% Wm (○) | — | 18.0 | — |
| Example 12 | C16-1,3PD-EO19 | 30° C. 50% Wm (○) | — | — | 17.7 |
| Example 13 | C16-1,3PD-EO12-PO2 | 30° C. 40% Wm (○) | — | 18.0 | — |
| Example 14 | C16-1,3PD-EO6-PO2-EO6 | 30° C. 40% Wm (○) | — | 18.1 | — |
| Example 15 | C16-1,4BD-EO14 | 30° C. 40% Wm (○) | — | 20.9 | — |
| Example 16 | C16-1,6HD-EO14 | 30° C. 40% Wm (○) | — | 22.4 | — |
| Example 17 | C18-1,3PD-EO14 | 30° C. 40% Wm (○) | — | 24.4 | — |
| Example 18 | C18-1,4BD-EO14 | 30° C. 40% Wm (○) | — | 25.8 | — |
| Comparative Example 4 | C16-EG-EO9 | 30° C. 50% H (X) | 14.3 | — | — |
| Comparative Example 5 | C16-EG-EO14 | 30° C. 40% Wm (○) | — | 13.5 | — |
| Comparative Example 6 | C16-EG-EO19 | 30° C. 50% Wm (○) With 5% PEG | — | — | 14.5 |

As understood from Tables 3 and 6, the internal two hydrophilic groups-containing compound according to the present invention has high detergency even when contained at a low concentration in the detergent composition, is less likely to cause gelation at low temperatures, and has excellent low-temperature stability and flowability.

INDUSTRIAL APPLICABILITY

The surfactant composition and the detergent composition according to the present invention are useful as detergents for various uses.

The invention claimed is:

1. A compound represented by a chemical formula (1) below:

[Chemical Formula (1)]

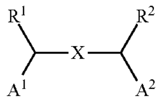

wherein $R^1$ and $R^2$ are each an aliphatic hydrocarbon group, X is a single bond or a hydrocarbon group having 1 or more and 5 or less carbon atoms, a total number of carbon atoms of $R^1$, $R^2$, and X is 2 or more and 39 or less, $A^1$ is —O(-$A^{11}$O)$_m$—H or —O(-$A^{12}$O)$_p$—H, $A^2$ is —O—$R^3$O(-$A^{21}$O)$_n$—H or —O-$A^{221}$O(-$A^{22}$O)$_q$—H, $R^3$ is an alkanediyl group having 4 or more and 18 or less carbon atoms, $A^{11}$ and $A^{21}$ are each independently an alkanediyl group having 2 or more and 3 or less carbon atoms, $A^{12}$ and $A^{22}$ are each independently an alkanediyl group having 2 or more and 8 or less carbon atoms, $A^{221}$ is a linear alkane-α,ω-diyl group having 3 or more and 8 or less carbon atoms, m, n, p, and q are an average value and are each independently 0 or more, a total of m and n is more than 0 and 50 or less, and a total of p and q is more than 0 and 50 or less.

2. The compound according to claim 1, wherein X is a single bond.

3. The compound according to claim 1, wherein $A^{11}$ and $A^{21}$ are each independently an alkanediyl group having 2 or 3 carbon atoms.

4. The compound according to claim 1, wherein the compound represented by the chemical formula (1) comprises two or more compounds that have a same total number of carbon atoms of $R^1$, $R^2$, and X, but are different in number of carbon atoms of each of $R^1$ and $R^2$.

5. A surfactant composition comprising the compound according to claim 1.

6. A detergent composition comprising the compound according to claim 1.

7. The detergent composition according to claim 6, wherein a content of the compound represented by the chemical formula (1) in the detergent composition is 0.5 mass % or more and 99 mass % or less.

8. The compound according to claim 1, wherein $R^1$ and $R^2$ are a same aliphatic hydrocarbon group or different aliphatic hydrocarbon groups.

9. The compound according to claim 1, wherein the total number of carbon atoms of $R^1$, $R^2$, and X is 10 or more and 20 or less.

10. The compound according to claim 1, wherein the compound represented by the chemical formula (1) includes two or more compounds that have a single bond as X and a same total number of carbon atoms of $R^1$, $R^2$, and X, but are different in number of carbon atoms of each of $R^1$ and $R^2$.

11. The compound according to claim 1, wherein when the compound represented by the chemical formula (1) includes two or more compounds that have a single bond as X, and are different in total number of carbon atoms of $R^1$ and $R^2$, the total content of a compound having a total number of carbon atoms of $R^1$ and $R^2$ of 14 and a compound having a total number of carbon atoms of $R^1$ and $R^2$ of 16 is, in the whole compound represented by the chemical formula (1), 75 mass % or more.

12. The compound according to claim 1, wherein the alkanediyl group as $R^3$ is a linear alkanediyl group.

13. The compound according to claim 1, wherein the number of carbon atoms of the alkanediyl group as $R^3$ is 4 or more and 12 or less.

14. The compound according to claim 1, wherein the alkanediyl group of $A^{11}$ and $A^{21}$ are a 1,2-alkanediyl group.

15. The compound according to claim 1, wherein the total of m and n is 5 or more and 30 or less.

16. The compound according to claim 1, wherein the total of p and q is 5 or more and 30 or less.

17. A method for producing the compound according to claim 1, comprising a process of adding an alkylene oxide to a precursor compound represented by the chemical formula (2) below:

[Chemical Formula (2)]

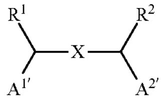

wherein $R^1$ and $R^2$ are each an aliphatic hydrocarbon group, X is a single bond or a hydrocarbon group having 1 or more and 5 or less carbon atoms, a total number of carbon atoms of $R^1$, $R^2$, and X is 2 or more and 39 or less, $A^{1'}$ is —OH, $A^{2'}$ is —O—$R^3$OH or —O-$A^{221}$OH, $R^3$ is an alkanediyl group having 4 or more and 18 or less carbon atoms, and $A^{221}$ is a linear alkane-α,ω-diyl group having 3 or more and 8 or less carbon atoms.

18. The method according to claim 17, wherein X is a single bond.

19. The method according to claim 17, wherein the compound represented by the chemical formula (2) comprises two or more compounds that have a same total number of carbon atoms of $R^1$, $R^2$, and X, but are different in number of carbon atoms of each of $R^1$ and $R^2$.

* * * * *